United States Patent
d'Abreu et al.

(10) Patent No.: US 11,036,404 B2
(45) Date of Patent: *Jun. 15, 2021

(54) DEVICES, SYSTEMS, AND METHODS FOR RECONFIGURING STORAGE DEVICES WITH APPLICATIONS

(71) Applicant: Smart IOPS, Inc., Milpitas, CA (US)

(72) Inventors: Manuel Antonio d'Abreu, El Dorado Hills, CA (US); Ashutosh Kumar Das, Cupertino, CA (US)

(73) Assignee: SMART IOPS, INC., Milpitas, CA (US)

(*) Notice: Subject to any disclaimer, the term of this patent is extended or adjusted under 35 U.S.C. 154(b) by 173 days.

This patent is subject to a terminal disclaimer.

(21) Appl. No.: 16/509,142

(22) Filed: Jul. 11, 2019

(65) Prior Publication Data

US 2019/0332289 A1 Oct. 31, 2019

Related U.S. Application Data

(63) Continuation of application No. 15/810,001, filed on Nov. 10, 2017, now Pat. No. 10,394,474.

(51) Int. Cl.
*G06F 3/06* (2006.01)

(52) U.S. Cl.
CPC .......... *G06F 3/0629* (2013.01); *G06F 3/0602* (2013.01); *G06F 3/0604* (2013.01);
(Continued)

(58) Field of Classification Search
CPC .............. G06F 3/00; G06F 3/06–0689; G06F 5/00–16; G06F 9/00–548;
(Continued)

(56) References Cited

U.S. PATENT DOCUMENTS 5,539,895 A 7/1996 Bishop et al.
5,574,850 A 11/1996 Fandrich
(Continued)

OTHER PUBLICATIONS

A. Ali, M. A. R. Saghir, H. Akkary, H. Artail, H. Hajj and M. Awad, "RASSD: A dynamically reconfigurable active storage device for energy efficient data analytics," 2013 4th Annual International Conference on Energy Aware Computing Systems and Applications (ICEAC), Istanbul, Turkey, 2013, pp. 81-86 (Year: 2013).*

(Continued)

*Primary Examiner* — Daniel C. Chappell
(74) *Attorney, Agent, or Firm* — Willink & Hunt LLP; Marcus T. Hunt

(57) ABSTRACT

Devices, systems, and methods are provided for dynamically reconfiguring storage devices with applications in real-time to meet user needs, such as running different applications. The devices, systems, and methods relate to a storage device that includes memory for data storage and a controller for storing data in the memory. The controller includes a processor configured to receive an indication to reconfigure the controller with an application that is user-selected; receive the application; reconfigure the controller with the application such that the controller is enabled to run the application; receive an indication to run the application with a set of data as input; receive the set of data; run the application with the set of data as input; and generate resulting data from running the application with the set of data as input.

20 Claims, 8 Drawing Sheets

(52) U.S. Cl.
CPC .......... *G06F 3/0634* (2013.01); *G06F 3/0664* (2013.01); *G06F 3/0683* (2013.01); *G06F 3/0688* (2013.01)

(58) Field of Classification Search
CPC ..... G06F 11/00–3696; G06F 12/00–16; G06F 13/00–4295; G06F 17/00–40; G06F 21/00–88; G06F 2003/0691–0698; G06F 2009/3883; G06F 2009/45562–45595; G06F 2201/00–885; G06F 2209/00–549; G06F 2211/00–902; G06F 2212/00–7211; G06F 2221/00–2153
See application file for complete search history.

(56) References Cited

U.S. PATENT DOCUMENTS

| | | | |
|---|---|---|---|
| 6,092,169 | A | 7/2000 | Murthy et al. |
| 6,505,216 | B1 | 1/2003 | Schutzman et al. |
| 6,904,490 | B2 | 6/2005 | Arimilli et al. |
| 6,917,993 | B2 | 7/2005 | Johnson et al. |
| 7,593,974 | B2 | 9/2009 | Suzuki et al. |
| 8,112,395 | B2 | 2/2012 | Patel et al. |
| 8,429,373 | B2 | 4/2013 | Acedo et al. |
| 8,468,292 | B2 * | 6/2013 | Aszmann ............... G06F 3/0688 711/103 |
| 8,478,947 | B2 | 7/2013 | Ingram et al. |
| 8,990,490 | B2 | 3/2015 | Gopalakrishnan et al. |
| 9,047,187 | B2 | 6/2015 | Guo et al. |
| 9,244,831 | B2 * | 1/2016 | El Maghraoui ..... G06F 12/0246 |
| 9,442,669 | B2 | 9/2016 | Nicolae |
| 9,507,664 | B2 | 11/2016 | Ogihara |
| 9,530,491 | B1 | 12/2016 | Uttarwar et al. |
| 9,547,593 | B2 | 1/2017 | Tran |
| 9,600,192 | B2 | 3/2017 | Chambliss et al. |
| 9,612,952 | B2 * | 4/2017 | Hayes ................... G06F 3/0647 |
| 9,740,416 | B2 | 8/2017 | Chambliss et al. |
| 9,990,301 | B1 | 6/2018 | Kanaujia et al. |
| 10,007,458 | B2 * | 6/2018 | Bates ................... G06F 12/0246 |
| 10,031,819 | B2 * | 7/2018 | Banerjee ............. G06F 9/45558 |
| 10,222,984 | B1 * | 3/2019 | O'Brien, III .......... G06F 3/0688 |
| 10,372,349 | B2 * | 8/2019 | Xu ....................... G06F 12/0802 |
| 10,394,474 | B2 * | 8/2019 | d'Abreu ............... G06F 3/0688 |
| 10,423,525 | B2 * | 9/2019 | Gerhart ................ G06F 3/0659 |
| 10,552,085 | B1 | 2/2020 | Chen et al. |
| 10,776,024 | B2 * | 9/2020 | Yuan ..................... G06F 3/0688 |
| 2002/0026549 | A1 * | 2/2002 | Powers .................. H04L 43/00 710/104 |
| 2002/0099934 | A1 | 7/2002 | Cromer et al. |
| 2003/0236937 | A1 | 12/2003 | Almeida et al. |
| 2005/0114560 | A1 | 5/2005 | Coleman et al. |
| 2006/0004957 | A1 | 1/2006 | Hand et al. |
| 2008/0109592 | A1 | 5/2008 | Karamcheti et al. |
| 2008/0147962 | A1 | 6/2008 | Diggs et al. |
| 2008/0215952 | A1 | 9/2008 | Bae |
| 2009/0024734 | A1 | 1/2009 | Merbach et al. |
| 2009/0172333 | A1 | 7/2009 | Marcu et al. |
| 2009/0307670 | A1 | 12/2009 | Kashyap et al. |
| 2011/0060927 | A1 | 3/2011 | Fillingim et al. |
| 2011/0077749 | A1 * | 3/2011 | Shang .................. G05B 19/052 700/5 |
| 2014/0266303 | A1 | 9/2014 | Das |
| 2014/0337665 | A1 | 11/2014 | Ogihara |
| 2016/0062696 | A1 * | 3/2016 | Cerrelli .................. G06F 3/061 711/202 |
| 2016/0179371 | A1 | 6/2016 | Sinclair |

OTHER PUBLICATIONS

A. Ali et al., "An operating system fora Reconfigurable Active SSD processing node," 2012 19th International Conference on Telecommunications (ICT), Jounieh, Lebanon, 2012, pp. 1-6 (Year: 2012).*

M. Sharafeddin et al., "On the efficiency of automatically generated accelerators for reconfigurable active SSDs," 2014 26th International Conference on Microelectronics (ICM), Doha, Qatar, 2014, pp. 124-127 (Year: 2014).*

Huang Letian and Li Guangjun, "A reconfigurable system for digital signal processing," 2008 5th International Multi-Conference on Systems, Signals and Devices, Amman, Jordan, 2008, pp. 1-4 (Year: 2008).*

N. Abbani et al., "A Distributed Reconfigurable Active SSD Platform for Data Intensive Applications," 2011 IEEE International Conference on High Performance Computing and Communications, Banff, AB, Canada, 2011, pp. 25-34 (Year: 2011).*

A Distributed Reconfigurable Active SSD Platform for Data Intensive Applications; Abbani et al.; IEEE International Conference on High Performance Computing and Communications; Sep. 2-4, 2011 (year: 2011).

An operating system for a Reconfigurable Active SSD processing node; Ali et al.; 19th International Conference on Telecommunications; Apr. 23-25, 2012 (year: 2012).

Definition knowledge base; Rouse, Margaret; Mar. 2007; retrieved from https://searchcrm.techtarget.com/definition/knowledge-base on Oct. 1, 2018 (Year: 2007).

Exploiting Sequential and Temporal Localities to Improve Performance of NAND Flash-Based SSDs; Lee et al.; ACM Transactions on Storage, vol. 12, iss. 3, Article No. 15; Jun. 2016 (Year: 2016).

SSDExplorer: A Virtual Platform for Performance/Reliability-Oriented Fine-Grained Design Space Exploration of Solid State Drives; Zuolo et al.; IEEE Transactions on Computer-Aided Design of Integrated Circuits and Systems, vol. 34, iss. 10, pp. 1627-1638; Oct. 2015 (Year: 2015).

U.S. Appl. No. 15/904,080, filed Feb. 23, 2018, Office Action dated Jul. 24, 2020; Office Action dated Dec. 12, 2019; Office Action dated Sep. 6, 2019; Office Action dated Dec. 4, 2018.

U.S. Appl. No. 16/188,944, filed Nov. 13, 2018, Office Action dated Aug. 3, 2020.

* cited by examiner

DEVICES, SYSTEMS, AND METHODS FOR RECONFIGURING STORAGE DEVICES WITH APPLICATIONS

CROSS-REFERENCE TO RELATED APPLICATIONS

This application is a continuation of U.S. patent application Ser. No. 15/810,001, filed on Nov. 10, 2017, the entirety of which is incorporated herein by reference.

FIELD

The present disclosure relates generally to the field of data storage, and more particularly to storage devices and systems.

BACKGROUND

With advances in virtualized computing and storage systems, data storage devices may need to support different usage schemes for virtualization to be effective. Virtual users may have unique requirements and the storage devices may need to support these in real time.

In a virtualized computing system, a server may host several users simultaneously. All the users share the power of the CPU and associated storage. This can negatively impact system performance. Furthermore, each user may have unique workloads on the storage resources. Thus, the storage resources must satisfy the requirements for each user. One way existing systems deal with this is by having several types and classes of storage resources attached to the server, and then having the server use its cycles to manage and match the user requirements to the proper storage resource. This reduces the computational efficiency of the server.

BRIEF DESCRIPTION OF THE DRAWINGS

For a better understanding of at least an embodiment, reference will be made to the following Detailed Description, which is to be read in conjunction with the accompanying drawings, wherein.

SUMMARY

Figure 1:
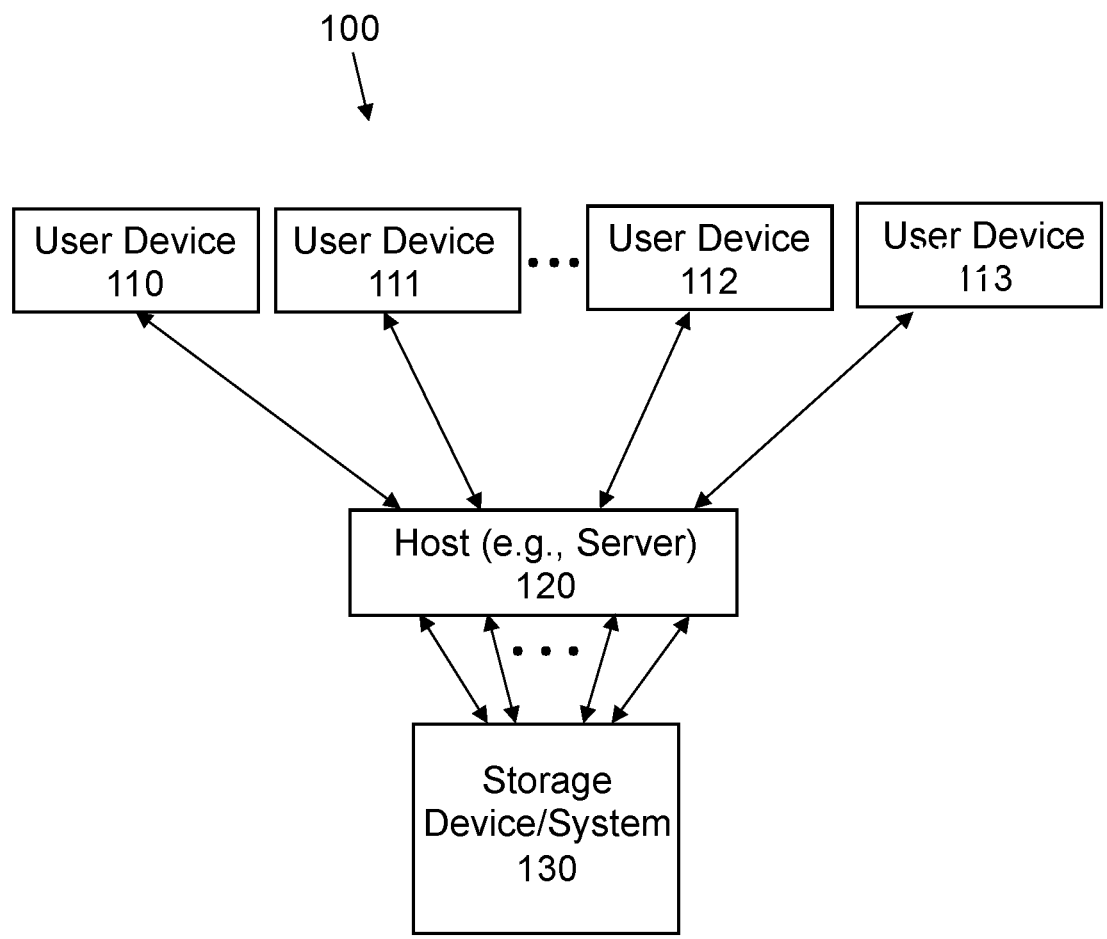
FIG. 1 illustrates a block diagram for an example computing system, according to an embodiment.

In certain aspects of the present disclosure, a storage device is provided that includes memory for data storage, and a first controller for storing data in the memory. The first controller is operably coupled to the memory and includes a first processor configured to: receive an indication to reconfigure the first controller with a first application; receive the first application; reconfigure the first controller with the first application such that the first controller is enabled to run the first application; receive an indication to run the first application with a first set of data as input; receive the first set of data; run the first application with the first set of data as input; and generate first resulting data from running the first application with the first set of data as input. The first application is user-selected to be run.

In certain aspects of the present disclosure, a system is provided that includes: a plurality of storage devices; and first processor operably coupled to the plurality of storage subsystems. The first processor configured to: receive an indication that a first application is user-selected to be ran on a first set of user data; determine that a first storage device of the plurality of storage devices is to be reconfigured with the first application; receive the first application; and send the first application to the first storage device for reconfiguration of the first controller with the first application. The first storage device includes first memory and a first controller operably coupled to the first memory. The first controller includes a second processor configured to: receive an indication to reconfigure the first controller with the first application; receive the first application; reconfigure the first controller with the first application such that the first controller is enabled to run the first application; receive an indication to run the first application with the first set of data as input; receive the first set of data; run the first application with the first set of data as input; and generate first resulting data from running the first application with the first set of data as input.

DETAILED DESCRIPTION

Before aspects of the present disclosure are described below with reference to the drawings in the description, common features may be designated by common reference numbers. Although certain examples are described herein with reference to a data storage system, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more conditions, or events not explicitly recited. As used herein, "exemplary" may indicate an example, an implementation, and/or an aspect, and should not be construed as limiting or as indicating a preference or a preferred example, implementation, and/or aspect.

In certain aspects of the present disclosure, devices, systems, and methods are provided for dynamically reconfiguring storage devices with one or more applications (or applications algorithms) in real-time to meet user needs as users select and run different applications. For example, a computing system may include a plurality of user devices that are communicatively coupled to a host in a client-server arrangement. The host may operably and communicatively couple to a storage device or a storage system, which includes a plurality of storage devices. The host provides users of the user devices to be able to select and run various applications available to the users. The applications can address a variety of domains, such as machine learning, artificial intelligence, genetics, and key-value pair for databases, for instance. It should be appreciated that this list of applications are provided as a sample of the potential domains of applications and are not meant to be an exhaustive list. The applications may be selected from a library of customized applications that is contained on the host, on the storage device or system, on another remote device (e.g., a third party server communicatively coupled to the host, or on some combinations thereof, for example. The storage device can be reconfigured dynamically in real-time to accommodate the varying needs of different users as they select applications to run on various sets of data. The dynamic reconfiguring of the storage devices in real-time enables the storage devices to operate efficiently in intensive computing environments. The usage model for a storage device, such as a solid-state storage device or drive (SSD) for example, may have to meet performance needs that cannot be met by just one type of operating condition. The devices, systems, and methods provided herein may be utilized to incorporate a mix of storage access algorithms, and to dynamically reconfigure these algorithms on the fly.

In certain aspects, the devices, systems, and methods described herein relate to virtualized computing and storage systems. The devices, systems, and methods may include a library of applications that can be utilized to reconfigure a storage device to a specific use in the virtualized system. In a virtual usage environment, a reconfiguration module in the storage device can be dynamically reconfigured and customized for user needs in real time. In certain embodiments, a controller of a storage device can be reconfigured with multiple applications at any time. The reconfiguration module may be implemented as a programmable processor, FPGA, logic, or any other scheme or combination thereof, in different embodiments.

In certain embodiments, a virtualized computing system includes a server and a storage device (or system) that is composed of one or more solid state drives (SSDs) which may support a specified number of virtual users. The storage device, such as an SSD, can be dynamically customized to support specialized algorithmic applications based on the user needs. The SSD can update the applications from a library of applications and dynamically swap applications for a virtual user based of the user needs. In certain aspects, the present disclosure provides for a SSD architecture that supports the dynamic programing of the SSD with applications and also dynamically makes these available in a virtual computing environment.

In certain aspects, the present disclosure describes devices, systems, and methods of accessing stored data in a storage device, using specific access modes or algorithms. This can be used in programming data to, or reading data from, a storage device or system, a memory card, or a set of memory cards, according to the use of an architecture using a centralized or distributed controller scheme for performing the function. For example, a controller of a data storage device may receive a data packet to be stored in a number of memory devices. The controller may partition the data word into multiple portions and the multiple portions may be interleaved across multiple memory devices. Also, the controller may simultaneously start parallel reads from several memory devices. Additionally, prior to the multiple data packets being stored into, or read from, the memory card, or storage system, a logical address corresponding to the data packets may be mapped to multiple physical addresses that indicate where each of the multiple data packets is to be stored in, or read from, the memory card or storage system. The writing of data and reading of data can be performed simultaneously across several memory cards in the storage system using a distributed control architecture.

The subject matter of the present disclosure may be applicable to a wide range of areas, including, but not limited to, storage, networking, communication and computing systems, appliances on the Internet, remotely controlled appliances, and design of reliable systems.

FIG. 1 illustrates a block diagram for an example computing system, according to an embodiment. In FIG. 1, a computing system 100 is shown including a host 120 (e.g., a server 120) communicatively coupled to a plurality of user devices (or client devices), shown as user devices 110, 111, 112, and 113. The number of user devices shown in FIG. 1 is exemplary and may vary in different embodiments. The user devices 110, 111, 112, and 113 may be remote from the host 120 and may be communicatively coupled to the host 120 through a wired or wireless connection, such as the Internet. The host 120 is shown communicatively coupled to a storage device (or system) 130. The storage device 130 may be coupled to the host 120 through a wired or wireless connection. For example, the storage device 130 may be coupled to the host 120 via a PCIe, SATA, USB, Open CAPI, or any other standard or proprietary interface. The user devices 110, 111, 112, and 113 may be utilized by users to access the host 120 and the storage device 130. The host 120 may host a number of users who share the system resources, such as applications and storage.

In certain aspects, the computing system 100 may be a virtual computing system serving one or more virtual users. From a user perspective, each user of the user devices 110, 111, 112, and 113 may be served as if the user is the sole user of the virtual computing system 100. In essence, from a user perspective, each user is a "virtual" and a sole user of the computing system 100. For example, the virtual computing system 100 may have a single compute server 120 to service a large number of users, who may not be aware that many users are sharing the virtual computing system 100. The user devices 110, 111, 112, and 113 represent users that are being served by the compute server 120. The potential number of user devices in the virtual computing system 100 may be limited by the capability of the compute server 120 and/or the attached storage device 130, in order to provide an acceptable level of service expected by the user base.

In an embodiment, the storage device 130 in FIG. 1 may include or correspond to a solid-state drive (SSD), which may be included in, or distinct from (and accessible to), the host 120 (e.g., a server). For example, the storage device 130 in FIG. 1 may include or correspond to an SSD, which may be used as an embedded storage drive (e.g., a mobile embedded storage drive), an enterprise storage drive (ESD), a client storage device, or a cloud storage drive, as illustrative, non-limiting examples. In an embodiment, the storage device 130 in FIG. 1 may be coupled to the host 120 (e.g., a server) indirectly, e.g., via a network. For example, the network may include a data center storage system network, an enterprise storage system network, a storage area network, a cloud storage network, a local area network (LAN), a wide area network (WAN), the Internet, and/or another network. In an embodiment, the storage device 130 of FIG. 1 may be a network-attached storage (NAS) device or a component (e.g., an SSD device) of a data center storage system, an enterprise storage system, or a storage area network.

Figure 2:
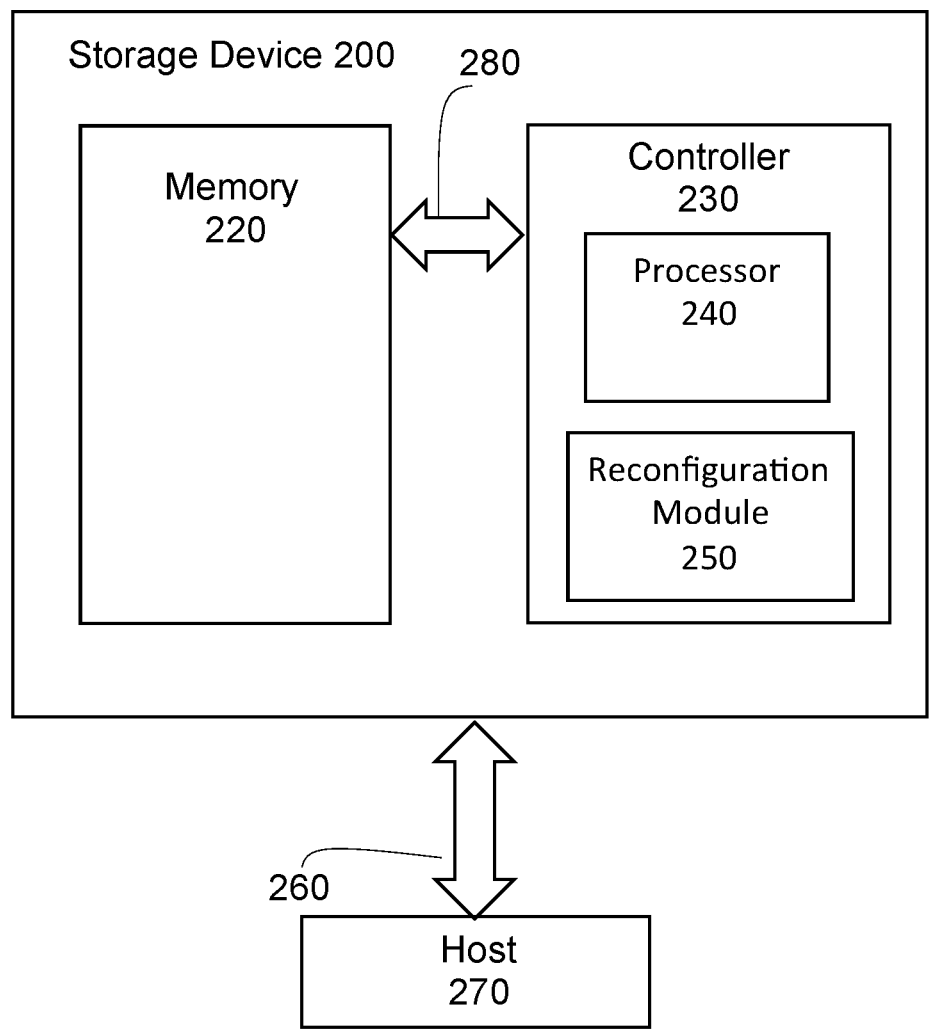
FIG. 2 illustrates a block diagram of an example storage device communicatively coupled to a host, according to an embodiment.

FIG. 2 illustrates a block diagram of an example storage device communicatively coupled to a host, according to an embodiment. In FIG. 2, a storage device 200 is shown including a controller 230 operably and communicatively coupled to a memory module 220 through a bus 280. The controller 230 utilizes the bus 280 to manage the memory module 220. The controller 230 may include discrete devices (not shown) for operation of the storage device 200. The memory module 220 may include an array of memory devices. The memory devices may include Flash, ReRam, MRAM, or any other non-volatile memory (NVM) technology, alone or in combination. The storage device 200 is shown communicatively coupled to a host 270 via a host interface 260, such as a bus. The storage device 200 communicates with the host 270 through the host interface 260. The host interface 260 may include, for example, a PCIe, SATA, USB, Open CAPI, or any other standard or proprietary interface. The controller 230 manages the communication to the host 270, the access to the NVM, and the memory management software. In an embodiment, the storage device 200 is implemented on the storage device (or system) 130 in the computing system 100 shown in FIG. 1.

The controller 230 is shown including a processor 240 and a reconfiguration module 250. The term "processor" is used broadly herein and may include one or more processing units or circuitry, such as one or more embedded or non-embedded processors, microprocessors, hard and soft microprocessor cores, etc. The processor 240 works in conjunction with the reconfiguration module 250 to implement the features and functions of the reconfiguration module 250.

The reconfiguration module 250 manages the reconfiguration of the controller with one or more applications. The applications may vary in function and implement various algorithms that users may utilize to manipulate sets of data (e.g., user data provided by the user) accordingly. For instance, an application may be run with a set of data as input to generate resulting data (or data resulting from the algorithm being performed on the set of data). Example applications may include, but are not limited to, algorithms related to machine learning, artificial intelligence, genetics, key-value pair for databases, etc.

The reconfiguration module 250 manages the allocation of the applications among the users of the user devices. For example, the reconfiguration module may generate tags and user information to track which applications the controller is currently reconfigured to run, and which users or user devices have initiated the running of the applications reconfigured in the controller. The number of applications that may be stored inside the reconfiguration module 250 at a given time may vary in different embodiments. For example, the reconfiguration module 250 may be reconfigured with a large number of applications at a given time in certain embodiments, such as 50 or more applications stored inside it at a given time.

The reconfiguration module 250 reconfigures the controller 230 with applications, enabling the controller 230 to run the applications. For example, the controller 230 may be reconfigured with applications by programming the applications into programmable logic blocks (or circuitry) within the controller 230. For instance, in an embodiment, the application may be generated in the format of a bitmap and sent to the storage device. The reconfiguration module 250 of the storage device may receive and store the bitmap such that a processor of the controller can utilize the bitmap to reconfigure the gates of the programmable logic blocks. In another embodiment, the programmable logic blocks may be on the storage device 200 and externally coupled to the controller 230. In another embodiment, the controller 230 may be reconfigured with applications by loading (or storing) the applications in volatile or non-volatile memory on the storage device 200, such as in internal memory in the controller 230 or in memory coupled to the controller 230. It should be appreciated that in another embodiment, the controller 230 may be reconfigured with applications by implementing a combination of one or more of the preceding embodiments. Once reconfigured with an application, the controller 230 may run (or execute) the application. The controller 230 may run the application with a set of data as inputs to generate resulting data. In some instances, the set of data may be received from the memory module 220. In other instances, the set of data may be received from the host 270 before being stored on the storage device.

In an embodiment, the storage device 200 may be implemented in a virtualized computing system (e.g., the virtualized computing system 100 of FIG. 1), where each of the virtual users of the user devices can have specific and unique data management applications needs. The host 270 (e.g., the server 120 in FIG. 1) may control whether a virtual user of a user device has the desired application assigned for his or her task. As an illustrative example, if a user of a user device wants to run an application (e.g., an application having an artificial intelligence algorithm) on a set of data, the host 270 may ensure that the appropriate application is available for the reconfiguration module 250 of the storage device 200 for use by the user. For example, the user may select a specific application to run on a specific set of data. In some instances, the set of data may already be stored in the memory module 220 of the storage device for the controller 230 to receive from the memory module 220. In other instances, the controller 230 may receive the set of data from the host 270. For example, the set of data may be uploaded from the user device to the host 270, which sends the set of data to the storage device 200. The set of data may either be utilized by the controller 230 at that time, or may be stored in the memory 220 and utilized at a later time.

Figure 3:
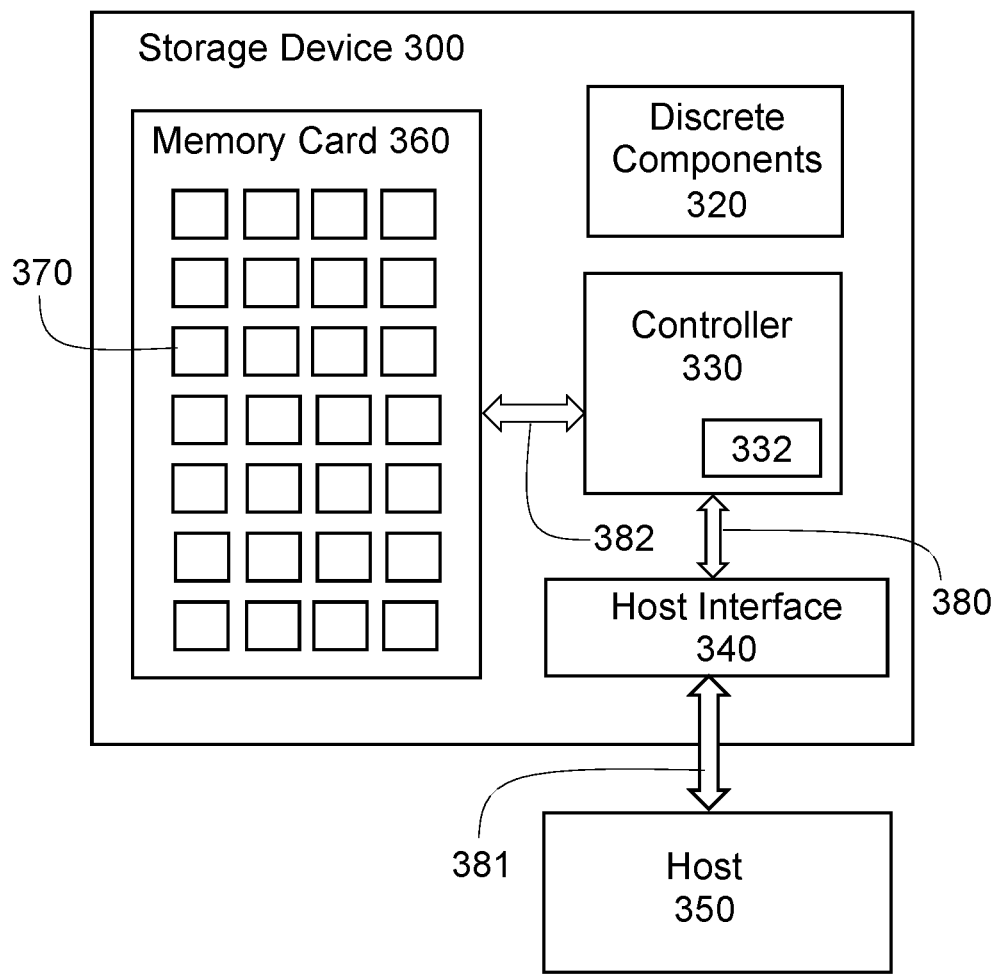
FIG. 3 illustrates a block diagram of an example storage device based on a centralized controller, according to an embodiment.

FIG. 3 illustrates a block diagram of an example storage device based on a centralized controller, according to an embodiment. In FIG. 3, a storage device 300 is shown including discrete components 320, a controller 330, a host interface 340, and a memory card 360. In an embodiment, the discrete components 320, the controller 330, the host interface 340, the memory card 360 may be implemented on a main board of the storage device. The storage device 300 includes a bus 380 that connects the controller 330 to the host interface 340, and a bus 382 which the controller 330 uses to manage the memory devices in the memory card 360. The storage device 300 of FIG. 3 communicates with a host 350 through a communication interface 381. The communication interface 381 may, for instance, be a PCIe, SATA, USB, Open CAPI, or any other standard or proprietary interface. The controller 330 manages the communication to the host 350, the access to the NVM, and the memory management software.

The controller 330 is shown including a reconfiguration module 332, which manages the reconfiguration of the controller with one or more applications, as well as managing the allocation of the applications among the users of the user devices. In an embodiment, the controller 330 is implemented as the controller 230 of FIG. 2, and the reconfiguration module 332 is implemented as the reconfiguration module 250 of FIG. 2. It should be appreciated that the discussion above for the controller 230 and the reconfiguration module 250 of FIG. 2 may also apply here. For the sake of brevity and clarity, every feature and function applicable to the controller 330 and the reconfiguration module 332 are not repeated here. For example, it should be appreciated that the controller 330 includes a processor, such as described in FIG. 2, although not shown in FIG. 3.

The memory card 360 includes an array of memory devices, of which a memory device 370 is a representative device. The memory card 360 may include a large number of memory devices. The memory devices (such as the memory device 370) may include, for example, Flash, ReRam, MRAM, or any other non-volatile memory (NVM) technology.

The discrete components 320 may be implemented to assist with the operation of the storage device 300, and may include passive components such as capacitors, resistors, and inductors, as well as active components such as diodes and transistors. This list of components is an illustrative list and not an exhaustive list.

In certain embodiments, the storage device 300 may operate in data centers where usage encompasses several scenarios. Some of the data may be accessed frequently and is "hot", while other data may be accessed infrequently and is practically "cold". Therefore, "hybrid" requirements may be present for the storage device 300 to accommodate (or account for). To accommodate the hybrid requirements, the storage device 300 supports technology that can be tailored to different usage scenarios. Instead of having a centralized control strategy, which would not adequately accommodate the hybrid requirements, the storage device 300 includes distributed data control, while having the main controller 330 manage host accesses, memory management, and other background tasks.

The controller 330 shown in FIG. 3 may include an error correction code (ECC) engine. The controller 330 may be configured to support ECC and memory management schemes specific to the technology used by the memory device 370.

In an embodiment, the storage device 300 may be implemented as the storage device 130 of FIG. 1 in a virtualized computing system. The storage device 300 of FIG. 3 communicates with the host 120 of FIG. 1. The host 120 of FIG. 1 sends instructions to the storage device 300 (e.g., through the bus 381 in FIG. 3). For example, the host 120 may instruct the storage device 300 to read, write, delete data, or any other storage management instructions.

Figure 4:
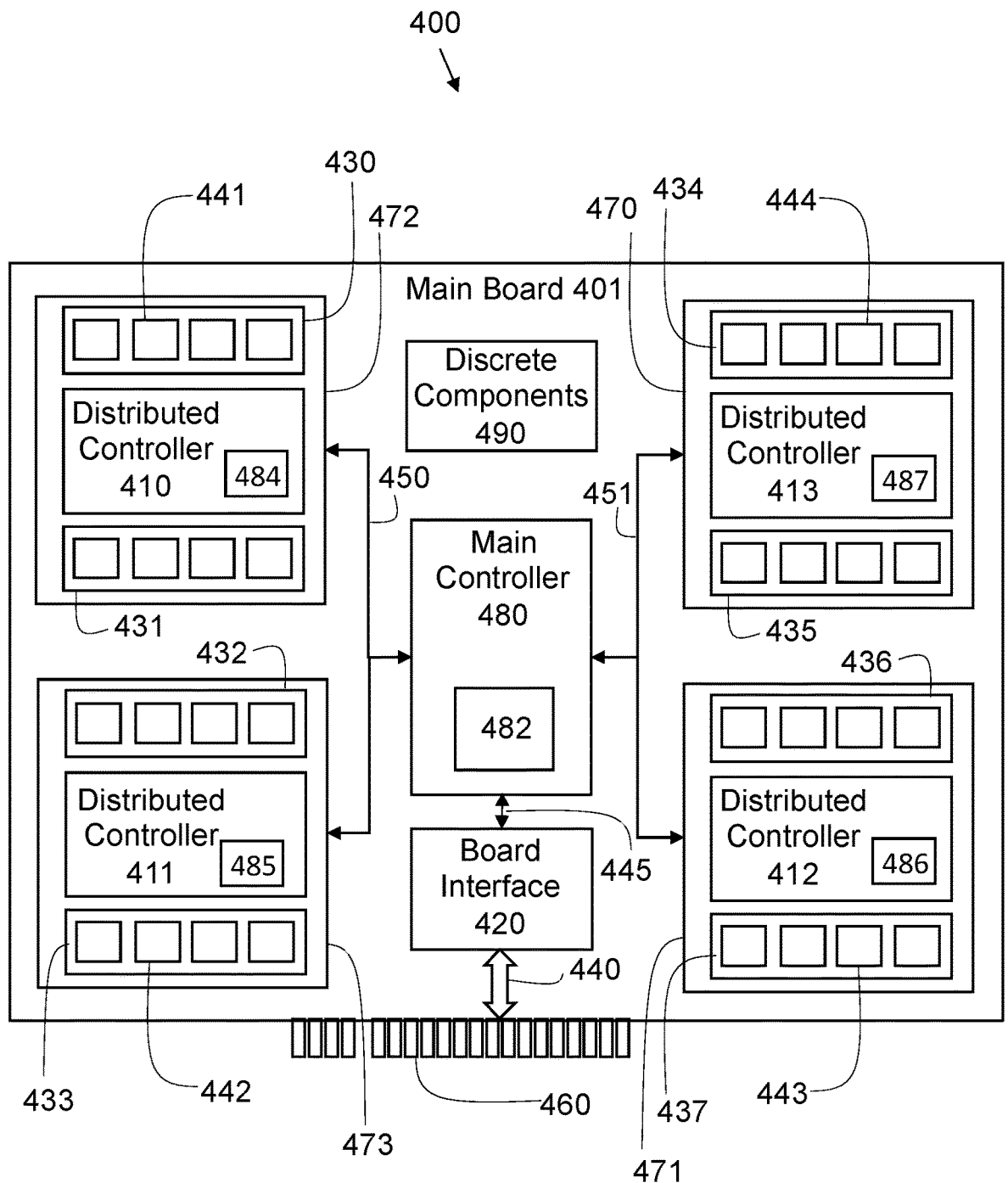
FIG. 4 illustrates a block diagram of an example storage device based on a distributed control architecture, according to an embodiment.

FIG. 4 illustrates a block diagram of an example storage device based on a distributed control architecture, according to an embodiment. In FIG. 4, a storage device 400 is shown including discrete components 490, a main controller 480, a board interface 420, and four memory modules 470, 471, 472 and 473 on a main board 401. A different number of memory blocks than four may be implemented in other embodiments. Each of the memory modules 470, 471, 472 and 473 is managed by the distributed controllers 413, 312, 410, and 411, respectively. Each of the distributed controllers 410, 411, 412, and 413 manages respective memory banks in its domain. In the example embodiment shown in FIG. 4, the distributed controller 413 manages memory banks 434 and 435; the distributed controller 412 manages memory banks 436 and 437; the distributed controller 410 manages memory banks 430 and 431; and the distributed controller 411 manages memory banks 432 and 433. A different number of memory banks may be managed by any distributed controller in other embodiments.

Each memory bank 431, 432, 433, 434, 435, 436, and 437 can have one or more memory devices. The memory banks 430 and 431 are shown having memory devices 441; the memory banks 432 and 433 are shown having memory devices 442; the memory banks 434 and 435 are shown having memory devices 444; and the memory banks 436 and 437 are shown having memory devices 443. The memory devices 441, 442, 443, and 444 shown are exemplary and are not an exhaustive list. Each memory bank, such as memory bank 430, can have several memory devices, and can have a different number of memory devices than shown in the example embodiment of FIG. 4. One feature of the storage device 400 is that each of the memory banks 430, 431, 432, 433, 434, 435, 436, and 437 can be of a different technology. The main controller 480 communicates with the memory banks 430, 431, 432, 433, 434, 435, 436, and 437 via busses 450 and 451. The main controller 480 communicates with the board interface 420 of FIG. 4 via bus 445. The board interface 420 is coupled to a host interface 460 via a bus 440. The host interface 460 is not limited to a particular interface and may vary in different embodiments. For example, in one illustrative embodiment, the host interface 460 is a PCIe connector.

The memory modules 470, 471, 472 and 473 can be mounted directly on the main board 401 of FIG. 4. In another embodiment, memory card modules can be attached to the main board 401 via sockets and ribbons connectors. The control of the various memory banks is transparent to the host or server. The distributed controllers 410, 411, 412, and 413 shown in FIG. 4 may include an error correction code (ECC) engine. The distributed controllers 410, 411, 412, and 413 may be configured to support ECC and memory management schemes specific to the technology used by the memory modules 470, 471, 472, and 473. The memory devices 441, 442, 443, and 444 are illustrative examples of memory devices used in the memory banks 430, 431, 432, 433, 434, 435, 436, and 437. The number of memory devices implemented in a memory bank is not restricted to the number shown in FIG. 4. Other embodiments may include a different number of memory devices in each memory bank of each memory module.

In FIG. 4, the main controller 480 is shown including a reconfiguration module 482. The distributed controllers 410, 411, 412, and 413 are shown including reconfiguration modules 484, 485, 486, and 487, respectively. The reconfiguration modules 484, 485, 486, and 487 manage the reconfiguration of the respective distributed controllers 410, 411, 412, and 413 with one or more applications, and also manage the allocation of the applications among the users of the user devices for the respective distributed controllers 410, 411, 412, and 413.

The reconfiguration module 482 of the main controller 480 manages the distribution of applications to the appropriate distributed controllers 410, 411, 412, and 413. For example, the reconfiguration module 482 may communicate with the reconfiguration modules 484, 485, 486, and 487 to determine which storage device to send an application to for reconfiguration. For instance, the reconfiguration module 482 may determine the appropriate distributed controller to send the application to based on one or more factors, such as whether a distributed controller is ready for reconfiguration, whether a distributed controller has capacity to run an additional application, whether a distributed controller controls the memory having the set of data that will be used as input to the running application, etc. For instance, a distributed controller may be determined to not be ready for reconfiguration if it already busy servicing a virtual user request; or, if the distributed controller is in the process of being reconfigured, such as for another virtual user or for another application.

In another embodiment, the main controller 480 may be reconfigured with applications and run the applications. In such case, the reconfiguration module 482 manages the reconfiguration of the main controller 480 with the applications, and also manages the allocation of the applications among the users of the user devices for the main controller 480. A set of data to be input into a running application may be obtained from the appropriate distributed controller 410, 411, 412, or 413, which controls the memory bank in which the set of data is stored, for instance. The set of data may also be received from a host via the host interface 460 in other instances. In yet another embodiment, the main controller 480, as well as the distributed controllers 410, 411, 412, and 413, may be reconfigured with applications to run the applications.

It should be appreciated that the discussion above for the controllers 230 and 330 and the reconfiguration modules 250 and 332 of FIGS. 2 and 3, respectively, may also apply here. For the sake of brevity and clarity, every feature and function applicable to the main controller 480, the distributed controllers 410, 411, 412, and 413, and the reconfiguration modules 482, 484, 485, 486, and 487 are not repeated here. For example, it should be appreciated that the main controller 480 and the distributed controllers 410, 411, 412, and 413 includes a processor, such as described in FIG. 2, although not shown in FIG. 4.

Figure 5:
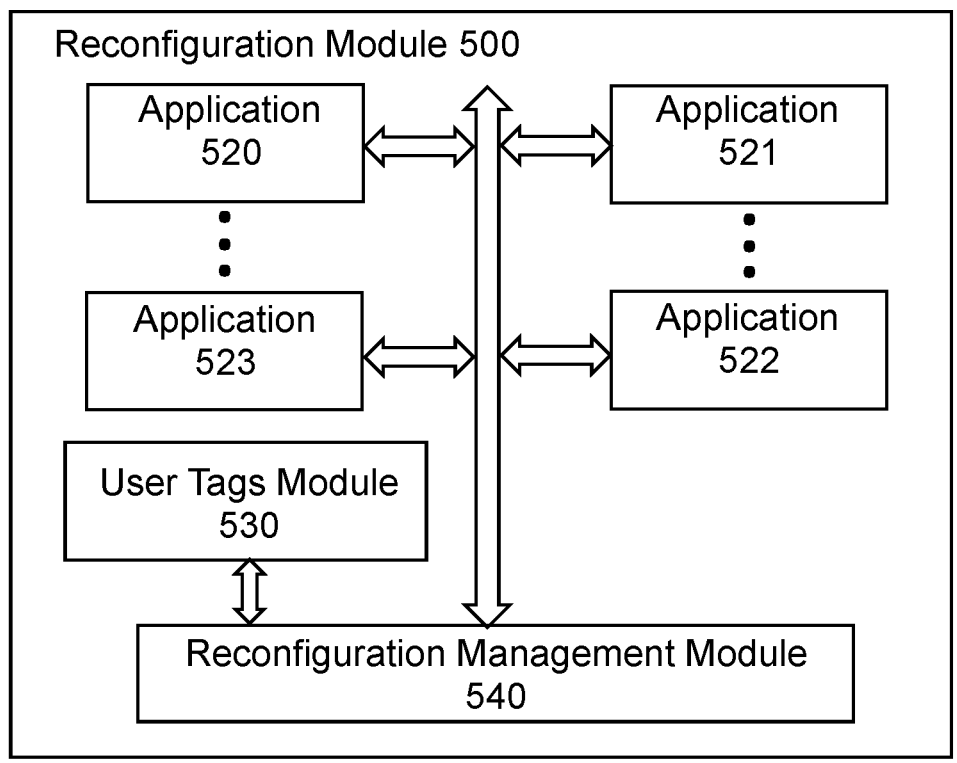
FIG. 5 illustrates an example reconfiguration module, according to an embodiment.

FIG. 5 illustrates an example reconfiguration module, according to an embodiment. In FIG. 5, a reconfiguration module 500 is shown including a reconfiguration management module 540. The reconfiguration management module 540 manages the reconfiguration of controller with one or more applications. For example, the reconfiguration management module 540 may manage the allocation of applications for virtual users; dynamically receive applications from an application library; dynamically assign applications to user devices as the users of those user devices request applications to be run, etc. For instance, when a user requests to run an application with a user device, the reconfiguration management module 540 receives the application (e.g., from an application management module on the host, which is described in further detail for FIG. 7); reconfigures the controller with the selected application; works in conjunction with a user tags module to track which applications the controller is reconfigured with, which users or user devices selected the applications, which applications are running, etc.

The reconfiguration module 500 is also shown including a user tags module 530 and applications 520, 521, 522, and 523. The applications 520, 521, 522, and 523 are example applications that a controller is currently reconfigured with. The number of applications shown in the FIG. 5 is an illustrative number and is not to be construed as the limiting number.

The user tags module 530 tracks which applications a controller is currently reconfigured with, and for which users or user devices. For example, when the reconfiguration management module 540 receives an application (e.g., the application 520) to reconfigure the controller with, the user tags module 530 may generate one or more tags that indicate that the application (e.g., the application 520) is selected to be run by a particular user or user device. The user tags module 530 may also generate one or more tags to track when an application is running.

The controller may be reconfigured with more than one application at one time, and may run more than one application at the same time. The user tags module 530 tracks each application and the corresponding users or user devices that selected each application to be ran. For example, the user tags module 530 may track that the applications 520 is assigned to a first user (and/or user device); the applications 521 and 522 are assigned to a second user (and/or user device); and, the application 523 is assigned to a third user (and/or user device). The number of users (and/or user devices) that can be tracked may vary in different embodiments. In addition, the user tags module 530 may also track which of the applications 520, 521, 522, and 523 are currently running.

The reconfiguration of the controller may occur dynamically in real-time as users select applications to run and as users stop running applications. For example, when a user selects an application to run, a controller may be reconfigured with the application and a user tag generated to indicate that the controller was reconfigured with the selected application for the user (or user device). When the user runs the application on a set of data, another user tag may be generated to indicate that the application is currently running. When the user stops an application, such as by closing the application, logging off, etc., the user tags module 530 updates the user tags accordingly. For example, in one embodiment, all the generated user tags for that application are deleted. In another embodiment, when the application is stopped, the user tag indicating that the application is running is deleted or otherwise modified to indicate that the application has been stopped. The user tag indicating that the controller is reconfigured with the application may be updated to indicate that the controller is still reconfigured with the application but no longer associated with the user who stopped running it. In this way, if a second user (or user device) wishes to run the application, the reconfiguration management module 540 will know that the controller is already reconfigured with the application, and may then generate a user tag (or update an existing user tag) to indicate that the controller is reconfigured for the second user (or user device). In an embodiment, a user tag is also generated to indicate that an application has been run on a set of data and generated a result.

Figure 6:
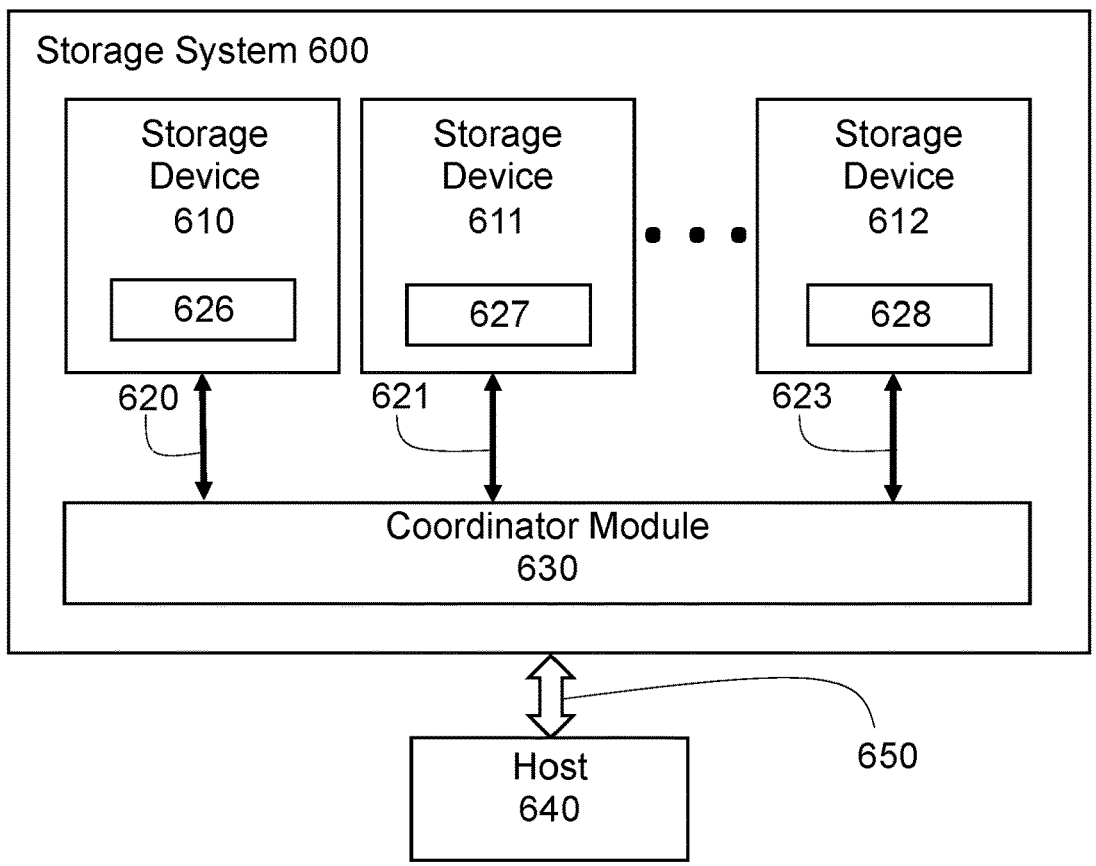
FIG. 6 illustrates a block diagram of an example storage system having more than one storage device, according to an embodiment.

FIG. 6 illustrates a block diagram of an example storage system having more than one storage device, according to an embodiment. In FIG. 6, a storage system 600 is shown including a coordinator module 630 and a plurality of storage devices (representatively shown as storage devices 610, 611, and 612). The storage devices 610, 611, and 612 include reconfiguration modules 626, 627, and 628, respectively, and are communicatively coupled to the coordinator module 630 through communication interfaces 620, 621, and 622, respectively. The communication interfaces 620, 621, and 622 may include a bus, such as PCIe, or any other standard or proprietary interface. For example, the storage system 600 may include a system having a processor and memory (not shown in FIG. 6), which is communicatively coupled to the storage devices 610, 611, and 612 through communication interfaces 620, 621, and 622, respectively. The processor is configured to implement the features and functions of the coordinator module. Again, the term "processor" is used broadly herein and may include one or more processing units or circuitry, such as one or more embedded or non-embedded processors, microprocessors, hard and soft microprocessor cores, etc. In an embodiment, each of the storage devices 610, 611, and 612 may include (or correspond to) a solid-state drive (SSD).

The coordinator module 630 manages the storage devices 610, 611, and 612 collectively with respect to the allocation of applications for reconfiguration in the storage devices 610, 611, and 612. For example, in an embodiment, the coordinator module 630 may manage all the applications and ensure that each of the storage devices 610, 611, and 612 have all the application in its domain. Example management tasks that the coordinator module 630 may perform may include, but are not limited to, receiving and providing applications to the appropriate storage devices 610, 611 and 612; tracking which applications are currently reconfigured in the storage devices 710, 711, and 712, and for which users or user devices; tracking which applications are currently being executed and run from each of the storage device 610, 611, and 612; etc. In an embodiment, the coordinator module 630 may receive the applications from the host 740. In an embodiment, the storage system 700 may also include the application library having the available applications therein. In such case, the coordinator module 630 receives the application from the application library.

The coordinator module 630 may also determine which storage device to reconfigure with a user-selected application. The coordinator module 630 may determine which storage device to reconfigure with the application based on one or more factors, such as whether a storage device is ready for reconfiguration, whether a storage device has capacity to run an additional application, whether a storage device contains the set of data that will be used as input to the running application, etc. For instance, a storage device may be determined to not be ready for reconfiguration if it is already busy servicing a virtual user request; if the reconfiguration module on the storage device is in the process of being reconfigured, such as for another virtual user or for another application; etc.

The coordinator module 630 shown communicates with the host 640 via a host interface 650. With reference to FIG. 1, the storage system 600 may be implemented as the storage system 130. In such case, the host 120 works in conjunction with the coordinator module 630 in FIG. 6 to assign and allocate applications for virtual users; to process the user's data; and to dynamically track, in real-time, all the applications that the storage devices 610, 611, and 612 have reconfigured therein. The coordinator module 630 may also manage the requirements of the virtual users, such as securing the data from being visible or accessed by other users.

In an embodiment, the coordinator module 630 may include a user tags module that tracks which applications the controller is reconfigured with, which users or user devices selected the applications, which applications are running, etc. The coordinator module 630 may include the user tags module in addition to, or in place of, user tags modules in the reconfiguration modules 626, 627, and 628 of the respective storage devices 610, 611, and 612.

Figure 7:
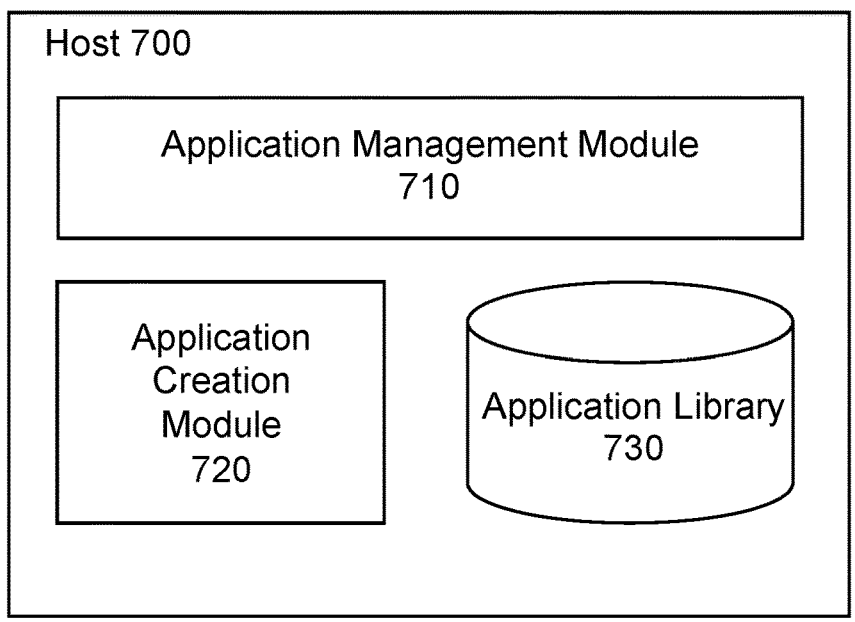
FIG. 7 illustrates a block diagram of an example host, according to an embodiment.

FIG. 7 illustrates a block diagram of an example host, according to an embodiment. In FIG. 7, a host 700 is shown including an application management module 710, an application creation module 720, and an application library 730. The application library 730 includes stored applications that are available to users of user devices. In an embodiment, the host 700 may be implemented as the host shown in communication with the storage device or system in FIGS. 1 through 6.

The application management module 710 manages communications with storage devices and with user devices for the reconfiguration process, such as to coordinate the distribution of applications, sets of data, and resulting data generated when applications are ran. The applications management module 710 may work in conjunction with the reconfiguration module of a storage device (e.g., the reconfiguration modules in FIGS. 2 through 5), or with a coordinator module in a storage system (e.g., the coordinator module 630 in FIG. 6). The application management module 710 also facilitates the retrieval of applications. For example, the application management module 710 may manage the application library 730 and the applications stored therein. For instance, when a user utilizes a user device to run an application on a set of data, the application management module 710 may retrieve the applications from the application library 730 and send the application to a storage device so that a controller on the storage device may be reconfigured with the application and run the application on the set of data.

In certain embodiments, such as shown the embodiment shown in FIG. 7, the application management module 700 may also include an application creation module 710. The application creation module 710 provides the tools and mechanisms for the creation (or generation) of applications that implement specific algorithms. For example, the application creation module 710 may enable a developer to create an application and to store it in the application library 730. In an embodiment, the users may create applications for storage in the application library 730. The application library 730 tracks all applications that are available in the application library 730, including the created applications. In this way, the application management module 700 can determine which applications are available to users, and may retrieve any user-selected applications, including the created applications.

In certain implementations, the application creation module 710 may be provided for application developers that are not necessarily the users of the user devices. For example, the owner of the host (e.g., a service provider) may utilize the application creation module 710 to create applications to be added to the application library and subsequently available to users. The owner may regulate and maintain different applications for different users, for instance. The owner may, for example, sell or provide varying subscriptions to different users of the system. The owner may also utilize the application creation module 710 to create and provide updates (e.g., application updates) to applications in the application library.

In another embodiment, the application management module 700 may be implemented on a host (e.g., host 120 of FIG. 1), and the application creation module 710 and the application library 730 may be implemented on a remote device (or system) communicatively coupled to the host. For example, the remote device may be a third party web server that maintains the application library and generates new applications for the application library. The third party web server may regulate and maintain different applications for different hosts (or owners of hosts) of different virtual computing systems, for instance. The third party web server may, for example, sell or provide varying subscriptions to different hosts of a virtual computing system. The third party web server may also provide updates (e.g., application updates) to the hosts of different virtual computing systems via a network, such as the Internet.

In another embodiment, the application management module 700 is implemented on the host (e.g., host 120 of FIG. 1) and the application library 730 is implemented on the storage device (e.g., the storage device 130 of FIG. 1). In such case, the application creation module 710 may be implemented on either the host, the storage device, or both, in different embodiments. In yet another embodiment, the applications library 730 may be maintained on both the host and the storage device.

Figure 8:
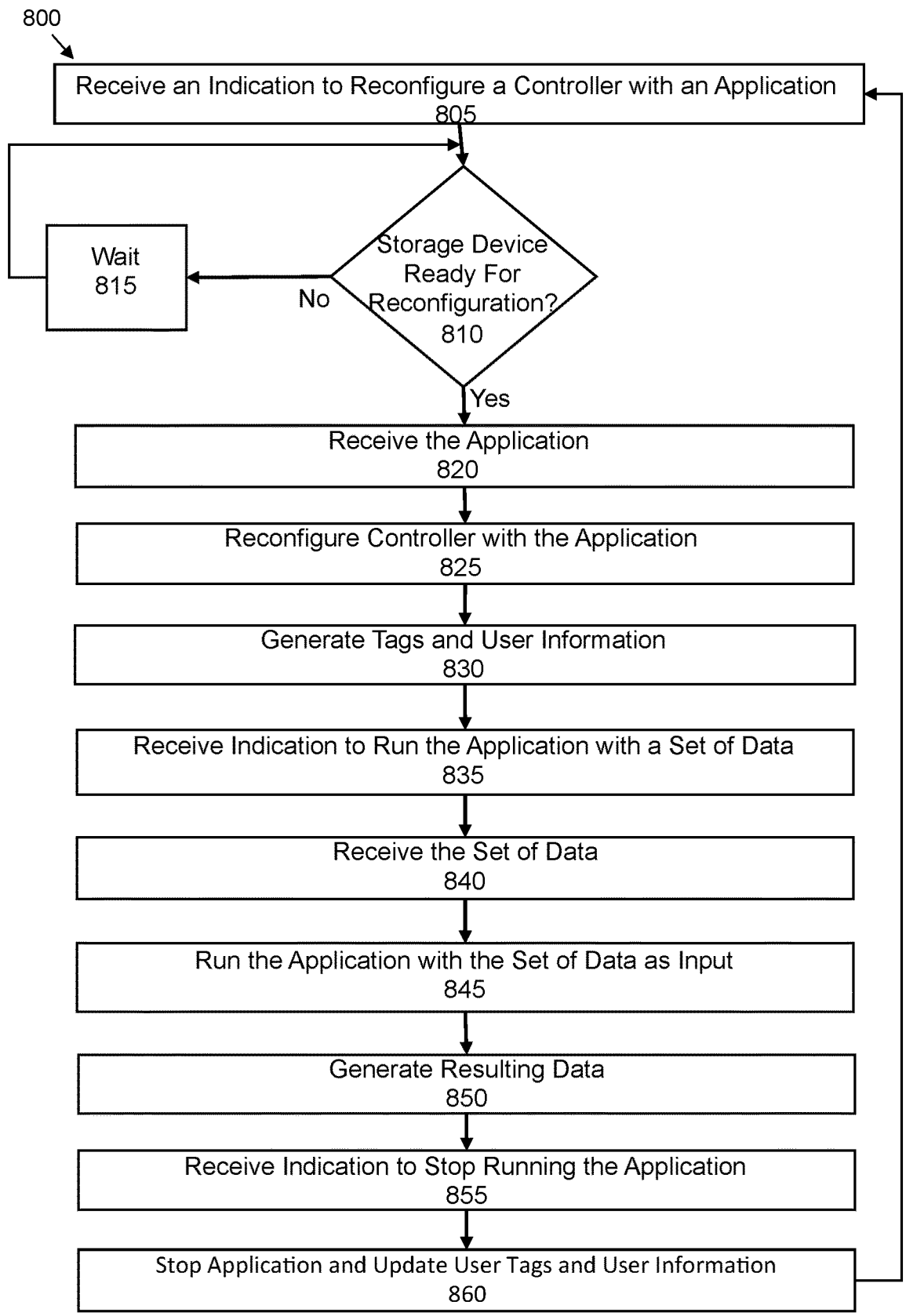
FIG. 8 illustrates a flow chart for an example method of dynamically reconfiguring a storage device or system with one or more applications, according to an embodiment.

FIG. 8 illustrates a flow chart for an example method of dynamically reconfiguring a storage device or system with one or more applications, according to an embodiment. This is an illustrative embodiment and the procedure may be implemented in a variety of manners without compromising the underlying principles of the disclosure. For example, it should be appreciated that the order of actions may vary in different embodiments, that one or more actions may not be implemented in other embodiments, and that additional actions that are not described may also be included in other embodiments. It should also be appreciated that the discussions above for FIGS. 1 through 7 may also apply to the method shown in FIG. 8. For the sake of brevity and clarity, every feature and function applicable to FIG. 8 is not repeated here.

In FIG. 8, a method 800 for dynamically reconfiguring a storage device or system with one or more applications is shown. At block 805 of the method 800, an indication is received to reconfigure a controller (e.g., the controllers 230 and 330 of FIGS. 2 and 3) with an application. For example, the indication may be provided by a user of user device (e.g., the user device 110 of FIG. 1) having selected an application to be ran. The user device sends a request to the host (e.g., the host 120 of FIG. 1) to run the selected application, which is received by the host as the indication to reconfigure a controller. An application management module (e.g., the application management module 710 of FIG. 7) of the host receives the request and initiates the process of reconfiguring a storage device (e.g., one of the storage devices of FIGS. 1 through 3) with the selected application. In an embodiment, the storage device may include an SSD. The host indicates to the storage device that a controller is to be reconfigured with the selected application.

At block 810, a determination is made as to whether the storage device is ready for reconfiguration. For example, the application management module of the host may communicate with a reconfiguration module (e.g., the reconfiguration module 250 and 332 of respective FIGS. 2 and 3) of the storage device to determine (or check) if a controller on the storage device is ready to be reconfigured with the selected application. The storage device may not be ready for reconfiguration for various reasons, such as the reconfiguration module may be busy servicing a virtual user request; the reconfiguration module may be in the process of another reconfiguration, such as for another virtual user or for another application; or the reconfiguration module may be unavailable for other reasons.

If at block 810, the storage device is not ready for reconfiguration with the selected application, then the application management module of the host waits until the storage device is ready for reconfiguration, as represented by block 815 and the arrow to block 810.

If at block 810, the storage device is ready for reconfiguration with the selected application, then the selected application is received, as represented by block 820. For example, the application management module in the host may receive the selected application from the application library (e.g., the application library 530 of FIG. 5) and then send the selected application to the storage device, which receives the selected application for reconfiguration. In an embodiment where the application library resides on a remote server from the host, the host first receives the selected application from the remote server before sending to the storage device. In an embodiment where the application library resides in an application library on the storage device, then the controller on the storage device receives the application from the application library.

At block 825, the controller on the storage device is reconfigured with the selected application. The controller may be reconfigured with the selected application in one or more manners, such as previously described for FIG. 2, which are not repeated here again for the sake of clarity and brevity.

At block 830, user tags may be generated to indicate that the controller is reconfigured with the selected application for the user or user device that selected the application to be ran. At block 835, an indication is received to run the application with a set of data as input. For example, the user may select a set of data to run the application on, either at the time the application is selected to be ran or subsequent thereto. At block 840, the controller receives the set of data. The controller may receive the set of data from the memory in which the controller is coupled to and controls. For example, the user may upload (or enter) data from the user device to the host, which may then send the uploaded data to the storage device. The storage device may store the uploaded data in memory (e.g., the memory module 220 and the memory device 360 of respective FIGS. 2 and 3) on the storage device until the selected application is run and the uploaded data is needed.

At block 845, the controller that is reconfigured with the selected application runs the selected application with the set of data as input. In an embodiment, an additional user tag or user information may be generated to track that the selected application is running.

When the controller runs the selected application with the set of data stored on the memory on the storage device, both the running of the application and the receiving of the set of data occur on the storage device. Thus, the delay which would occur if the host runs the application while accessing data from the storage device is avoided. The overall speed of performing the computations and operations necessary for the selected application is increased or maximized because the corresponding computations and operations of the algorithms of the application, as well as the retrieval of the set of data, are performed within the storage device.

In some instances, instructions to run the application may be sent from the host along with the selected application such that the selected application is run once the controller is reconfigured with the application. For example, the user may initially select to run an application on a specific set of data. In another embodiment, instructions to run the application are sent from the host to the controller some time after the controller is reconfigured with the selected application. For example, the user may first select to run the application, and then later select the set of data for input. In some instances, the user may also select additional sets of data to run the application on at a later time.

At block 850, resulting data is generated from running the selected application with the set of data as input. The controller may then send the resulting data to the host, which in turn may send the resulting data to the user device for the user. The resulting data may also be stored in memory on the host, the storage device, or both in various implementations. At block 855, the controller receives an indication to stop running the application. For example, the user may request via the user device to stop the selected application. The request may be sent to the host, which may indicate to the controller to stop running the selected application.

At block 860, the application is stopped. In some instances, the application may also stop after the application has been ran with the user data and the resulting data generated. In an embodiment, the user tags module may update the user tags to indicate that the controller is not currently running the selected application. Once the selected application is stopped, the method 800 may be repeated when an application is requested or required, as represented by the arrow from block 860 to block 805. In one embodiment, the user tags module may generate or update a user tag to indicate that the controller is still reconfigured with the selected application but no longer for the initial user who selected it to be ran. In this way, if a subsequent request to reconfigure the application is initiated, by the same or different user, the reconfiguration management module (e.g., the reconfiguration management module 540 of FIG. 5) may forego the reconfiguration process because the controller is still reconfigured with the application. If the selected application is deleted or written over with a different application, then user tags module may generate or update a user tag accordingly. In this way, if the same or different user attempts to subsequently run the deleted (or written over) application, the reconfiguration management module will know that the controller should be reconfigured with the selected application.

In certain aspects, a storage device (e.g., the storage device 400 of FIG. 4) may be implemented having a main controller and distributed controllers available for reconfiguration with a selected application. The method 800 may also be applicable to the configuration process of the main controller and the distributed controllers.

For example, at block 805, the main controller may communicate with the host to receive an indication that one of the controllers on the storage device is to be reconfigured with the selected application. If the main controller is to be reconfigured with the selected application, then the host determines if the main controller is ready for reconfiguration before sending the application at block 810. If the main controller is not ready for reconfiguration, then the host waits to send the application until the main controller is ready, as represented by block 815. In an embodiment, the reconfiguration module of the main controller manages the reconfiguration of the distributed controllers and determines which distributed controller is to be reconfigured with the selected application. In such case, the reconfiguration module of the main controller communicates with the reconfiguration module of the selected distributed controller to indicate that the selected distributed controller is to be reconfigured with the selected application at block 805, and to determine when the selected distributed controller is ready to be reconfigured with the selected application at block 810.

The main controller may select the appropriate distributed controller to send the application to based on one or more factors, such as whether a distributed controller is ready for reconfiguration, whether a distributed controller has capacity to run an additional application, whether a distributed controller controls the memory having the set of data that will be used as input to the running application, etc. The distributed controller may not be ready for reconfiguration for various reasons, such as the reconfiguration module may be busy servicing a virtual user request; the reconfiguration module may be in the process of another reconfiguration, such as for another virtual user or for another application; or the reconfiguration module may be unavailable for other reasons.

Once a controller (e.g., the main controller or one of the distributed controllers) is selected for reconfiguration and ready for reconfiguration, the application is received by the selected controller at block 820. If the main controller is selected for reconfiguration, then the main controller receives the application and then the main controller is reconfigured with the selected application at block 825. If a distributed controller is selected for reconfiguration by the main controller, then the main controller receives the application and sends the application to the selected distributed controller. The selected distributed controller receives the application at block 820 and is reconfigured with the selected application at block 825. The controller may be reconfigured with the selected application in one or more manners, such as previously described for FIG. 2, which are not repeated here again for the sake of clarity and brevity.

At block 830, user tags and user information are generated to indicate that the selected controller (e.g., the main controller or one of the distributed controllers) is reconfigured with the selected application for the user or user device that selected the application to be ran. At block 835, an indication is received to run the application with a set of data as input. For example, the user may select the set of data to run the selected application on, either at the time the application is selected to be ran or subsequent thereto. At block 840, the selected controller receives the set of data from memory on the storage device. If the selected controller is one of the distributed controllers, the set of data may be received from the memory in which the selected controller is coupled to and controls. The user may upload data from the user device to the host, which may then send the uploaded data to the storage device. The storage device may store the uploaded data in memory on the storage device until the selected application is run and the uploaded data is needed.

At block 845, the controller reconfigured with the selected application runs the selected application with the set of data as input. In an embodiment, an additional user tag or user information may be generated to track that the selected application is running. When the controller runs the selected application with the set of data stored on the memory of the storage device, both the running of the application and the receiving of the set of data occur on the storage device. Thus, the delay which would occur if the host runs the application while accessing data from the storage device is avoided. The overall speed of performing the computations and operations necessary for the selected application is increased or maximized because the corresponding computations and operations of the algorithms of the application, as well as the retrieval of the set of data, are performed within the storage device. Furthermore, when a distributed controller runs the selected application with a set of data that is stored in memory controlled by the distributed controller, the overall speed of performing the computations and operations necessary for the selected application is increased or maximized for similar reasoning.

At block 850, a resulting data is generated from running the selected application with the set of data as input. The selected controller may then send the resulting data to the host, which in turn may send the resulting data to the user device for the user. The resulting data may also be stored in memory on the host, the storage device, or both in various implementations. At block 855, the selected controller receives an indication to stop running the application. For example, the user may request via the user device to stop the selected application. The request may be sent to the host, which may indicate to the main controller to stop the running of the selected application. If a distributed controller is running the application, then the main controller indicates to the distributed controller to stop running the application.

At block 860, the selected controller stops running the application. In some instances, the application may also stop after the application has been ran and the resulting data generated. In an embodiment, the user tags module may update the user tags to indicate that the controller is not currently running the selected application. Once the selected application is stopped, the method 800 may be repeated when an application is requested or required, as represented by the arrow from block 860 to block 805. In one embodiment, the user tags module may generate or update a user tag to indicate that the controller is still reconfigured with the selected application but no longer for the initial user who selected it to be ran. In this way, if a subsequent request to reconfigure the application is initiated, by the same or different user, the reconfiguration management module (e.g., the reconfiguration management module 540 of FIG. 5) may forego the reconfiguration process because the controller is still reconfigured with the application. If the selected application is deleted or written over with a different application, then user tags module may generate or update a user tag accordingly. In this way, if the same or different user attempts to subsequently run the deleted (or written over) application, the reconfiguration management module will know that the controller should be reconfigured with the selected application.

In certain aspects, a storage system (e.g., the storage system 600 of FIG. 6) may include a plurality of storage devices (e.g., the storage devices 610, 611, and 612 of FIG. 6) available for reconfiguration with the selected application. In such case, one of the storage devices may be selected for reconfiguration with the selected application. The method 800 may also be applicable to the reconfiguration process of one of the storage devices in the storage system.

The storage system includes a coordinator module (e.g., the coordinator module 630 in FIG. 6) to manage the plurality of storage devices. The coordinator module is communicatively coupled to the host, and the host indicates to the coordinator module that a storage device is to be reconfigured with the selected application at block 805. At block 805, the coordinator module of the storage system may communicate with the host to receive an indication that one of the controllers on the storage device is to be reconfigured with the selected application. The coordinator module manages the reconfiguration of the storage devices and determines which storage device is to be reconfigured with the selected application. In such case, the coordinator module communicates with a reconfiguration module of the selected storage device to indicate that the selected storage device is to be reconfigured with the selected application at block 805, and to determine when the selected storage device is ready to be reconfigured with the selected application at block 810.

At block 810, the applications management module of the host may communicate with the coordinator module to determine if the storage system is ready to begin the reconfiguration process. The coordinator module selects one of the storage devices for reconfiguration and then determines (or checks) if the selected storage device is ready for reconfiguration. The coordinator module communicates with the reconfiguration module of the selected storage device to determine if one or more of the controllers in the storage device are ready to be reconfigured with the selected application. In an embodiment, the coordinator module determines if one or more selected storage devices is ready for reconfiguration before selecting one of the storage devices for reconfiguration.

The coordinator module may select a storage device based on one or more factors. In certain embodiments, the coordinator module may select the storage device to be reconfigured at random; based on an assignment scheme, which assigns specific storage devices to specific user devices and/or user; based on which storage devices are most likely to be ready for reconfiguration, such as those that are not currently reconfigured with a threshold number of selected applications or those that are not currently running a threshold number of applications; based on whether a storage device controls the memory having the set of data that will be used as input to the running application; or based on any other factors, such as those described in FIG. 6 for the coordinator module 630. The storage device may not be ready for reconfiguration for various reasons, such as the storage device may be busy servicing a virtual user request; the storage device may be in the process of another reconfiguration, such as for another virtual user or for another application; or the storage device may be unavailable for other reasons.

At block 815 the application management module of the host may wait to send the selected application until the storage system is ready for reconfiguration. At block 820, the application management module of the host sends the selected application to the coordinator module of the storage system. If the storage system is ready to receive the selected application but the selected storage device is not ready for reconfiguration, then the coordinator module waits until the selected storage device is ready before sending the selected application to the selected storage device. When the selected storage device is ready, then the coordinator module sends the selected application to the reconfiguration module of the selected storage device.

For example, the application management module in the host may receive the selected application from the application library (e.g., the application library 530 of FIG. 5) and then send the selected application to the storage system, which in turn sends the selected application to the selected storage device. In an embodiment where the application library resides on a remote server from the host, the host first receives the selected application from the remote server before sending to the storage system. In an embodiment where the application library resides in an application library on the storage system, then the coordinator module receives the application from the application library and then sends it to the selected storage device.

At block 825, the controller on the selected storage device is reconfigured with the selected application. For example, in an embodiment, the controller may be reconfigured with applications by programming the applications into programmable logic blocks. For instance, the application may be sent to the storage device in the form of a bitmap and stored therein. The controller may include a processor that reconfigures the gates of programmable logic blocks based on the bitmap. The controller may also be reconfigured with the selected application in one or more other manners, such as previously described for FIG. 2, which are not repeated here again for the sake of clarity and brevity.

At block 830, user tags may be generated by the user tags module to indicate that the selected storage device or controller is reconfigured with the selected application for the user or user device that selected the application. For example, the user tags module may be implemented in the reconfiguration module for the selected controller. In another embodiment, the coordinator module may include the user tags module instead of the reconfiguration module of the selected controller, or alternatively may include a separate user tags module in addition to the user tags module of the reconfiguration module of the selected controller.

At block 835, an indication is received to run the application with a set of data as input. For example, the user may select a set of data to run the application on, either at the time the application is selected to be ran or subsequent thereto. At block 840, the selected controller receives the set of data. The controller may receive the set of data from the memory in which the controller is coupled to and controls. For example, the user may upload (or enter) data from the user device to the host, which may then send the uploaded data to the storage system. The storage system may store the uploaded data in memory on the selected storage device until the selected application is run and the uploaded data is needed.

At block 845, the controller reconfigured with the selected application runs the selected application with the set of data as input. In an embodiment, an additional user tag or user information may be generated to track that the selected application is running. When the controller runs the selected application with the set of data stored on the memory of the storage device, both the running of the application and the receiving of the set of data occur on the storage device. Thus, the delay which would occur if the host runs the application while accessing data from the storage device is avoided. The overall speed of performing the computations and operations necessary for the selected application is increased or maximized because the corresponding computations and operations of the algorithms of the application, as well as the retrieval of the set of data, are performed within the storage device.

In some instances, instructions to run the application may be sent from the host along with the selected application such that the selected application is run once the controller is reconfigured with the application. For example, the user may initially select to run an application on a specific set of data. In another embodiment, instructions to run the application are sent from the host to the controller after the controller is reconfigured with the selected application. For example, the user may first select to run the application, and then later select the set of data for input. In some instances, the user may also select additional sets of data to run the application on at a later time.

At block 850, a resulting data is generated from running the selected application with the set of data as input. The selected controller may then send the resulting data to the host, which in turn may send the resulting data to the user device for the user. The resulting data may also be stored in memory on the host, the storage device, or both in various implementations. At block 855, the selected controller receives an indication to stop running the application. For example, the user may request via the user device to stop the selected application. The request may be sent to the host, which may indicate to the coordinator module to stop running the selected application which may then indicate to the selected storage device to stop running the selected application.

At block 860, the selected controller stops running the application. In some instances, the application may also stop after the application has been ran with the user data and the resulting data generated. In an embodiment, the user tags module may update the user tags to indicate that the controller is not currently running the selected application. Once the selected application is stopped, the method 800 may be repeated when an application is requested or required, as represented by the arrow from block 860 to block 805.

In one embodiment, the user tags module (e.g., in the coordinator module, the selected storage device, or both) may generate or update a user tag to indicate that the controller is still reconfigured with the selected application but no longer for the initial user who selected it to be ran. In this way, if a subsequent request to reconfigure the controller with the application is initiated, by the same or different user, the coordinator module and the reconfiguration management module (e.g., the reconfiguration management module 540 of FIG. 5) of the selected storage device may forego the reconfiguration process because the controller is still reconfigured with the application. If the selected application is deleted or written over with a different application, then user tags module may generate or update a user tag accordingly. In this way, if the same or different user attempts to subsequently run the deleted (or written over) application, the coordinator module and the reconfiguration management module will know that the controller should be reconfigured with the selected application.

In certain embodiments where a storage system has multiple storage devices for reconfiguration, more than one storage device may be utilized. For example, in one embodiment, controllers of more than one storage device may be reconfigured with the same application, each in a similar manner as described for the method 800. Each controller may run the application with different portions of the set of data as inputs, for instance. Utilizing more than one storage device in such manner may increase computational performance.

Figure 9:
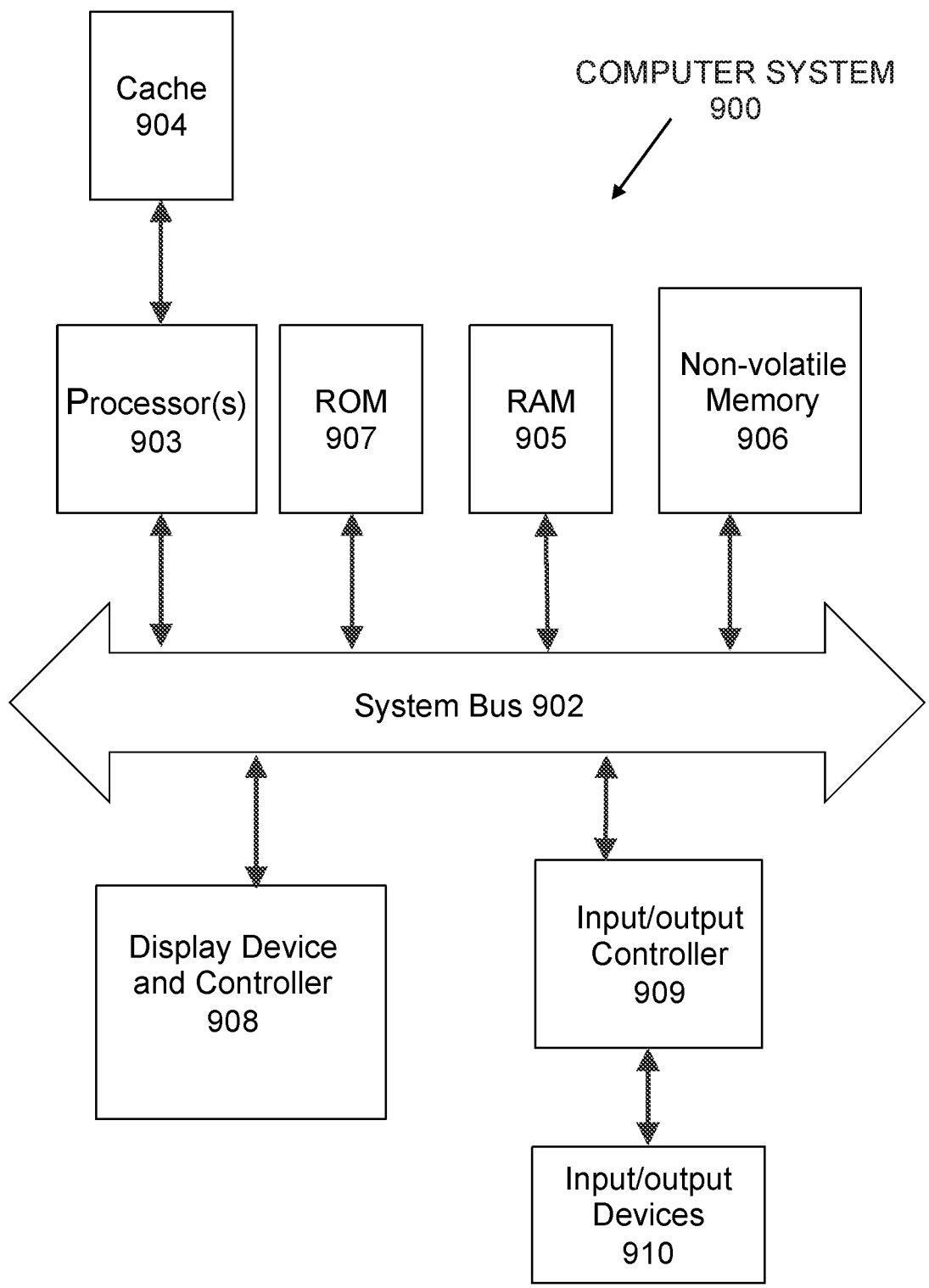
FIG. 9 depicts a block diagram of an exemplary computer system (or data processing system), according to an embodiment.

FIG. 9 depicts a block diagram of an exemplary computer system (or data processing system), according to an embodiment. Note that while FIG. 9 illustrates various components of a computer system, it is not intended to represent any particular architecture or manner of interconnecting the components. The computer system 900 shown in FIG. 9 may represent an example host system (e.g., hosts 120, 270, 350, and 700 of respective FIGS. 1, 2, 3, and 7); an example remote device communicatively coupled to the host (e.g., a third party server); an example computer system included in a storage system, such as the storage system 600 of FIG. 6 for example; and an example user device (e.g., user devices 110, 111, 112, and 113 of FIG. 1). It is also be appreciated that networked computers and other data processing systems which have fewer components, or perhaps more components, may also be implemented as the computer system.

As shown, the host system 900 includes a system bus 902, which is coupled to a microprocessor 903, a Read-Only Memory (ROM) 907, a volatile Random Access Memory (RAM) 905, as well as other nonvolatile memory 906. In the illustrated embodiment, microprocessor 903 is coupled to cache memory 904. A system bus 902 can be adapted to interconnect these various components together and also interconnect components 903, 907, 905, and 906 to other devices, such as a display controller and display device 908, and to peripheral devices such as input/output ("I/O") devices 910. Types of I/O devices can include keyboards, modems, network interfaces, printers, scanners, video cameras, or other devices well known in the art. Typically, I/O devices 910 are coupled to the system bus 902 through I/O controllers 909. In one embodiment the I/O controller 909 includes a Universal Serial Bus ("USB") adapter for controlling USB peripherals or other type of bus adapter.

RAM 905 can be implemented as dynamic RAM ("DRAM"), which requires power continually in order to refresh or maintain the data in the memory. The other nonvolatile memory 906 can include a magnetic hard drive, magnetic optical drive, optical drive, DVD RAM, solid-state storage drive, or other type of memory system that maintains data after power is removed from the system. While FIG. 9 shows that nonvolatile memory 906 as a local device coupled with the rest of the components in the host system 900, it will be appreciated by skilled artisans that the described techniques may use a nonvolatile memory remote from the system, such as a network storage device coupled with the host system through a network interface, such as a modem, Ethernet interface, or any other standard or proprietary interface.

Example Embodiments

In certain aspects of the present disclosure, a storage device is provided that includes memory for data storage, and a first controller for storing data in the memory. The first controller is operably coupled to the memory and includes a first controller configured to: receive an indication to reconfigure the first controller with a first application; receive the first application; reconfigure the first controller with the first application such that the first controller is enabled to run the first application; receive an indication to run the first application with a first set of data as input; receive the first set of data; run the first application with the first set of data as input; and generate first resulting data from running the first application with the first set of data as input. The first application is user-selected to be ran.

In certain embodiments, the first processor of the first controller is further configured to: receive an indication to reconfigure the first controller with a second application; receive the second application; reconfigure the first controller with the second application such that the first controller is enabled to run the second application; receive an indication to run the second application with a second set of data as input; receive the second set of data; run the second application with the second set of data as input; and generate second resulting data from running the second application with the second set of data as input. The second application is user-selected to be ran. In an embodiment, the first processor of the first controller is further configured to: generate a first user tag indicating that the first controller is reconfigured with the first application for a first user or user device; and generate a second user tag indicating that the first controller is reconfigured with the second application for a second user or user device. The second application is user-selected to be ran by the second user or user device. The first application is user-selected to be ran by the first user or user device. In an embodiment, the first processor of the first controller is further configured to: receive an indication to stop running the first application; stop running the first application; and update the first user tag to indicate that the first controller stopped running the first application.

In an embodiment, the storage device also includes a host interface coupled to the first controller to enable a host to communicate with the first controller and the memory. The first application is received from the host via the host interface. The first processor of the first controller is further configured to send the resulting data to the host via the host interface.

In an embodiment, the first set of data is received from the memory.

In an embodiment, the storage device includes a solid-state drive. The solid-state drive includes the first controller and the memory.

In an embodiment, the first application is received from an application library.

The application library includes a plurality of applications.

In an embodiment, the reconfiguring of the first controller with the first application dynamically occurs in real-time as the first application is user-selected.

In certain embodiments, the storage device further includes a main controller operably coupled to the memory; and a plurality of distributed controllers. Each of the plurality of distributed controllers is operably coupled to the main controller and to a respective portion of the memory. The plurality of distributed controllers includes the first controller. The main controller includes a second processor configured to: determine the first controller is to be reconfigured with the first application; and send the first application to the first controller. In an embodiment, the second processor of the main controller is further configured to determine the first set of data is stored in a first respective portion of the memory. The first respective portion is controlled by the first controller. The determination that the first controller is to be reconfigured with the first application is based on the determination that the first set of data is stored in the first respective portion controlled by the first controller. In an embodiment, the storage device further includes a second controller operably coupled to a second respective portion of the memory. The second controller is one of the plurality of distributed controllers. The second controller incudes a third processor configured to: receive an indication to reconfigure the second controller with a second application; receive the second application; reconfigure the second controller with the second application such that the second controller is enabled to run the second application; receive an indication to run the second application with a second set of data as input; receive the second set of data; run the second application with the second set of data as input; and generate second resulting data from running the second application with the second set of data as input. The second application is user-selected to be ran. The second processor of the main controller is further configured to: determine the second set of user data is stored in the second respective portion of the memory; determine that the second controller is to be reconfigured with the second application based on the determination that the second set of user data is stored in the second respective portion controlled by the second controller; and send the second application to the second controller. The second respective portion is controlled by the second controller. In an embodiment, the second processor of the main controller is further configured to: generate a first user tag indicating that the first controller is reconfigured with the first application for a first user or user device; and generate a second user tag indicating that the first controller is reconfigured with the second application for a second user or user device. The second application is user-selected to be ran by the second user or user device. The first application is user-selected to be ran by the first user or user device. In an embodiment, the storage device comprises a solid-state drive. The solid-state drive includes the main controller, the plurality of distributed controllers, and the memory. In an embodiment, the reconfiguring of the first controller with the first application dynamically occurs in real-time as the first application is user-selected. In an embodiment, the first set of data is received from a first respective portion of the memory controlled by the first controller.

In certain embodiments, the storage device further includes: a main controller operably coupled to the memory;

and a plurality of distributed controllers. Each of the plurality of distributed controllers is operably coupled to the main controller and to a respective portion of the memory. The main controller includes the first controller. In an embodiment, the first processor of the first controller is further configured to receive the first set of data from a distributed controller of the plurality of distributed controllers. In an embodiment, the reconfiguring of the first controller with the first application dynamically occurs in real-time as the first application is user-selected.

In certain aspects of the present disclosure, a system is provided that includes: a plurality of storage devices; and a first processor operably coupled to the plurality of storage subsystems. The first processor configured to: receive an indication that a first application is user-selected to be ran on a first set of user data; determine that a first storage device of the plurality of storage devices is to be reconfigured with the first application; receive the first application; and send the first application to the first storage device for reconfiguration of the first controller with the first application. The first storage device includes first memory and a first controller operably coupled to the first memory. The first controller includes a second processor configured to: receive an indication to reconfigure the first controller with the first application; receive the first application; reconfigure the first controller with the first application such that the first controller is enabled to run the first application; receive an indication to run the first application with the first set of data as input; receive the first set of data; run the first application with the first set of data as input; and generate first resulting data from running the first application with the first set of data as input.

In certain embodiments, the first processor is further configured to: receive an indication that a second application is user-selected to be ran on a second set of data; determine that the first storage device is to be reconfigured with the second application; receive the second application; and send the second application to the first storage device for reconfiguration of the first controller with the second application. The second processor of the first controller is further configured to: receive an indication to reconfigure the first controller with the second application; receive the second application; reconfigure the first controller with the second application such that the first controller is enabled to run the second application; receive an indication to run the second application with the second set of data as input; receive the second set of data; run the second application with the second set of data as input; and generate second resulting data from running the second application with the second set of data as input. In an embodiment, the first processor is further configured to: generate a first user tag indicating that the first storage device is reconfigured with the first application for a first user or user device; and generate a second user tag indicating that the first storage device is reconfigured with the second application for a second user or user device. The first application is user-selected to be ran by the first user or user device. The second application is user-selected to be ran by the second user or user device.

In certain embodiments, the first processor is further configured to: receive an indication that a second application is user-selected to be ran on a second set of user data; determine that a second storage device of the plurality of storage devices is to be reconfigured with the second application; receive the second application; and send the second application to the second storage device for reconfiguration of the second controller with the second application. The second storage device includes second memory and a second controller operably coupled to the second memory. The second controller includes a third processor configured to: receive an indication to reconfigure the second controller with the second application; receive the second application; reconfigure the second controller with the second application such that the second controller is enabled to run the second application; receive an indication to run the second application with the second set of data as input; receive the second set of data; run the second application with the second set of data as input; and generate second resulting data from running the second application with the second set of data as input. In an embodiment, the first processor is further configured to: generate a first user tag indicating that the first storage device is reconfigured with the first application for a first user or user device; and generate a second user tag indicating that the second storage device is reconfigured with the second application for a second user or user device. The second application is user-selected to be ran by the second user or user device. The first application is user-selected to be ran by the first user or user device.

In certain embodiments, the first processor is further configured to determine that the first set of user data is stored on the first storage device. The determination that the first storage device is to be reconfigured with the first application is based on the determination that the first set of user data is stored on the first storage device. In an embodiment, the system further includes a host interface for communication with a host. The host interface operably coupled to the first processor. The first application is received by the first processor from the host via the host interface. The first processor is further configured to: receive first resulting data from the first storage device, the first resulting data generated from running the first application with the first set of data as input; and transmit the first resulting data to the host via the host interface.

In an embodiment, the first application is received from an application library including a plurality of applications.

In an embodiment, the first storage device includes a solid-state drive. The solid-state drive includes the first controller and the first memory.

In an embodiment, the first storage device includes a distributed control system with a main controller and a plurality of distributed controllers. The first controller is one selected from a group consisting of: the main controller, and a distributed controller of the plurality of distributed controllers.

In an embodiment, the first set of data is received from the memory.

In certain aspects of the present disclosure, a method is provided that includes: receiving an indication to reconfigure a first controller of a first storage device with a first application; receiving the first application; reconfiguring the first controller with the first application such that the first controller is enabled to run the first application; receiving an indication to run the first application with a first set of data as input; receiving the first set of data; running, by a processor of the first controller, the first application with the first set of data as input; and generating first resulting data from running the first application with the first set of data as input. The first application is user-selected to be ran. The first storage device includes memory for data storage and operably coupled to the first controller. In an embodiment, the first application is received from a host. In an embodiment, the first set of data is received from the memory. In an embodiment, the data storage device the first storage device includes a solid-state drive. The solid-state drive includes the first controller and the first memory.

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in an order. Accordingly, the scope and spirit of the invention should only be judged in terms of any accompanying claims that may be appended, as well as any legal equivalents thereof.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, embodiments other than those specific described above are equally possible within the scope of any accompanying claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

For purposes of explanation, numerous specific details are set forth in order to provide a thorough understanding of the description. It should be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein. It should be appreciated that the block diagrams may include additional components that are not necessarily shown or described, but which have been left out for the sake of clarity and brevity.

Various components and modules described herein may include software, hardware, or a combination of software and hardware. The components and modules may be implemented as software modules, hardware modules, special-purpose hardware (e.g., application specific hardware, ASICs, DSPs, etc.), embedded controllers, hardwired circuitry, hardware logic, etc. Software content (e.g., data, instructions, and reconfiguration) may be provided via an article of manufacture including a non-transitory, tangible computer or machine-readable storage medium, which provides content that represents instructions that can be executed. The content may result in a computer performing various functions/operations described herein.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory that, when read and executed by a processor, cause the processor to perform operations to execute the processes and features described herein. The processes and features described herein may be implemented in software, firmware, hardware (e.g., an application specific integrated circuit, or a field-programmable gate array (FPGA)), or any combination thereof.

In an implementation, the processes and features described herein may be implemented as a series of executable modules run by a processor (e.g., in a computer system, individually or collectively in a distributed computing environment). The foregoing modules may be realized by hardware, executable modules stored on a computer-readable medium (or machine-readable medium), or a combination of both. For example, the modules may comprise a plurality or series of instructions to be executed by a processor in a hardware system. Initially, the series of instructions may be stored in memory, such as on a storage device. However, the series of instructions can be stored on any suitable computer readable storage medium. Furthermore, the series of instructions need not be stored locally, and could be received from a remote storage device, such as a server on a network, via the network interface. In various implementations, a module or modules can be executed by a processor or multiple processors in one or multiple locations, such as multiple servers in a parallel processing environment.

A computer or machine readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.); or any type of medium suitable for storing, encoding, or carrying a series of instructions for execution by a processor to perform any one or more of the processes and features described herein. The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

What is claimed is:

1. A virtualized computing system comprising:
   a solid-state storage system comprising a memory controller and non-volatile memory; and
   a server coupled to the solid-state storage system, the server configured to communicate with a plurality of user devices to enable virtual users of the plurality of user devices to store data in the non-volatile memory and to run one or more applications with the data as input;

wherein the server is further configured to:
receive an indication from a first user device that a first virtual user has selected a first application to be run; and
send the first application to the solid-state storage system to reconfigure the memory controller with the first application; and
wherein the solid-state storage system is configured to:
receive the first application from the server;
reconfigure the memory controller with the first application such that the memory controller is enabled to run the first application;
receive, from the server, an indication to run the first application with a first set of user-selected data stored in the non-volatile memory as input for the first application;
after the memory controller is reconfigured to run the first application, run the first application with the first set of user-selected data as input to generate first resulting data; and
send the first resulting data to the first user device.

2. The virtualized computing system of claim 1, wherein the server is further configured to:
receive an indication from the first user device that the first virtual user has selected a second application to be run; and
send the second application to the solid-state storage system to reconfigure the memory controller with the second application;
wherein the solid-state storage system is further configured to:
receive the second application from the server;
reconfigure the memory controller with the second application such that the memory controller is enabled to run the second application;
receive, from the server, an indication to run the second application with a second set of user-selected data stored in the non-volatile memory as input for the second application;
after the memory controller is reconfigured to run the second application, run the second application with the second set of user-selected data as input to generate second resulting data; and
send the second resulting data to the first user device.

3. The virtualized computing system of claim 2, wherein the memory controller is configured to:
generate a first user tag indicating that the memory controller is reconfigured with the first application for the first virtual user of the first user device; and
generate a second user tag indicating that the memory controller is reconfigured with the second application for the second virtual user of the second user device.

4. The virtualized computing system of claim 3, wherein the solid-state storage system is further configured to:
receive, from the server, an indication to stop running the first application;
stop running the first application; and
update the first user tag to indicate that the memory controller stopped running the first application.

5. The virtualized computing system of claim 1, wherein the solid-state storage system is a solid-state drive, and wherein the reconfiguring of the memory controller with the first application dynamically occurs in real-time as the first application is user-selected.

6. The virtualized computing system of claim 1, wherein the first application is received from an application library stored in a database, the application library comprising a plurality of applications.

7. The virtualized computing system of claim 1, further comprising the plurality of user devices coupled to the server.

8. The virtualized computing system of claim 1, wherein the solid-state storage system comprises:
a main controller operably coupled to the non-volatile memory; and
a plurality of distributed controllers, wherein each of the plurality of distributed controllers is operably coupled to the main controller and controls a respective portion of the non-volatile memory;
wherein the memory controller is one of the plurality of distributed controllers; and
wherein the main controller is configured to:
determine the first set of user-selected data is stored in a first respective portion of the non-volatile memory that is controlled by the first controller; and
send the first application to the first controller.

9. The virtualized computing system of claim 8, wherein the main controller is further configured to generate a first user tag indicating that the memory controller is reconfigured with the first application for the first virtual user of the first user device.

10. The virtualized computing system of claim 9, wherein the solid-state storage system is further configured to:
receive, from the server, an indication to stop running the first application;
stop running the first application; and
update the first user tag to indicate that the memory controller stopped running the first application.

11. A method of reconfiguring a memory controller with one or more applications in a virtualized computing system comprising a solid-state storage system and a server, the solid-state storage system coupled to the server and comprising a memory controller and non-volatile memory, the server configured to communicate with a plurality of user devices to enable virtual users of the plurality of user devices to store data in the non-volatile memory and to run one or more applications with the data as input, the method comprising:
receiving, by the server, an indication from a first user device that a first virtual user has selected a first application to be run;
sending, by the server, the first application to the solid-state storage system to reconfigure the memory controller with the first application;
receiving, by the solid-state storage system, the first application from the server;
reconfiguring, by the solid-state storage system, the memory controller with the first application such that the memory controller is enabled to run the first application;
receiving, by the solid-state storage system, an indication from the server to run the first application with a first set of user-selected data stored in the non-volatile memory as input for the first application;
after the memory controller is reconfigured to run the first application, running the first application with the first set of user-selected data as input to generate first resulting data; and
sending, by the solid-state storage system, the first resulting data to the first user device.

12. The method of claim 11, further comprising:
receiving, by the server, an indication from the first user device that the first virtual user has selected a second application to be run;
sending, by the server, the second application to the solid-state storage system to reconfigure the memory controller with the second application;
receiving, by the solid-state storage system, the second application from the server;
reconfiguring, by the solid-state storage system, the memory controller with the second application such that the memory controller is enabled to run the second application;
receiving, by the solid-state storage system, an indication from the server to run the second application with a second set of user-selected data stored in the non-volatile memory as input for the second application;
after the memory controller is reconfigured to run the second application, running the second application with the second set of user-selected data as input to generate second resulting data; and
sending, by the solid-state storage system, the second resulting data to the first user device.

13. The method of claim 12, further comprising:
generating, by the memory controller, a first user tag indicating that the memory controller is reconfigured with the first application for the first virtual user of the first user device; and
generating, by the memory controller, a second user tag indicating that the memory controller is reconfigured with the second application for the second virtual user of the second user device.

14. The method of claim 13, further comprising:
receiving, by the solid-state storage system, an indication from the server to stop running the first application;
stopping, by the solid-state storage system, the first application from running; and
updating, by the solid-state storage device, the first user tag to indicate that the memory controller stopped running the first application.

15. The method of claim 11, wherein the solid-state storage system is a solid-state drive, and wherein the reconfiguring of the memory controller with the first application dynamically occurs in real-time as the first application is user-selected.

16. The method of claim 11, wherein the first application is received from an application library stored in a database, the application library comprising a plurality of applications.

17. The method of claim 11, wherein the virtualized computing system further comprises the plurality of user devices coupled to the server.

18. The method of claim 11, wherein the solid-state storage system comprises:
a main controller operably coupled to the non-volatile memory; and
a plurality of distributed controllers, wherein each of the plurality of distributed controllers is operably coupled to the main controller and controls a respective portion of the non-volatile memory;
wherein the memory controller is one of the plurality of distributed controllers; and
wherein the method further comprises:
determining, by the main controller, that the first set of user-selected data is stored in a first respective portion of the non-volatile memory that is controlled by the first controller; and
sending, by the main controller, the first application to the first controller.

19. The method of claim 18, further comprising generating, by the main controller, a first user tag indicating that the memory controller is reconfigured with the first application for the first virtual user of the first user device.

20. The method of claim 19, further comprising:
receiving, by the solid-state storage system, an indication from the server to stop running the first application;
stopping, by the solid-state storage system, the first application from running; and
updating, by the solid-state storage system, the first user tag to indicate that the memory controller stopped running the first application.

* * * * *